US011695987B2

(12) United States Patent
Panger et al.

(10) Patent No.: US 11,695,987 B2
(45) Date of Patent: *Jul. 4, 2023

(54) FREQUENCY BAND SELECTION AND PROCESSING TECHNIQUES FOR MEDIA SOURCE DETECTION

(71) Applicant: The Nielsen Company (US), LLC, New York, NY (US)

(72) Inventors: Marko Panger, Plavje (SI); Joe Kerkes, Lutz, FL (US); Joze Arh, Rakek (SI)

(73) Assignee: The Nielsen Company (US), LLC, New York, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/344,640

(22) Filed: Jun. 10, 2021

(65) Prior Publication Data
US 2021/0306701 A1 Sep. 30, 2021

Related U.S. Application Data

(63) Continuation of application No. 16/502,426, filed on Jul. 3, 2019, now Pat. No. 11,039,204, which is a
(Continued)

(51) Int. Cl.
H04N 21/439 (2011.01)
H04N 7/10 (2006.01)
(Continued)

(52) U.S. Cl.
CPC ......... *H04N 21/4394* (2013.01); *H04N 7/106* (2013.01); *H04N 21/4112* (2020.08);
(Continued)

(58) Field of Classification Search
CPC ....... G10K 11/17817; G10K 11/17823; G10K 11/17827; G10K 11/17854;
(Continued)

(56) References Cited

U.S. PATENT DOCUMENTS 5,270,822 A 12/1993 Choi
5,436,653 A 7/1995 Ellis et al.
(Continued)

FOREIGN PATENT DOCUMENTS

WO 02/073593 A1 9/2002

OTHER PUBLICATIONS

International Searching Authority, "International Search Report," mailed in connection with International Patent Application No. PCT/US2014/068201, dated Mar. 18, 2015, 4 pages.
(Continued)

*Primary Examiner* — Dionne Pendleton

(57) ABSTRACT

Example methods, apparatus and articles of manufacture (i.e., physical storage media) to perform media source detection based on frequency band selection and processing are disclosed. Example meters disclosed herein are to compare a first audio signal from a monitored media device with a second audio signal from a first one of a plurality of media sources in communication with the monitored media device to determine a sequence of match results, the first audio signal associated with media presented by the media device. Disclosed example meters are also to compute a standard deviation of time delays associated with respective ones of the match results. Disclosed example meters are further to determine whether the first one of the media sources is a source of the media presented by the monitored media device based on the standard deviation.

12 Claims, 16 Drawing Sheets

Related U.S. Application Data continuation of application No. 15/476,450, filed on Mar. 31, 2017, now Pat. No. 10,349,123, which is a continuation of application No. 14/332,005, filed on Jul. 15, 2014, now Pat. No. 9,641,892.

(51) Int. Cl.

| | | |
|---|---|---|
| *H04N 21/462* | (2011.01) | |
| *H04N 21/41* | (2011.01) | |
| *H04N 21/436* | (2011.01) | |
| *H04N 21/442* | (2011.01) | |
| *H04N 21/422* | (2011.01) | |

(52) U.S. Cl.
CPC ... *H04N 21/4131* (2013.01); *H04N 21/42203* (2013.01); *H04N 21/436* (2013.01); *H04N 21/43615* (2013.01); *H04N 21/442* (2013.01); *H04N 21/44227* (2013.01); *H04N 21/462* (2013.01); *H04N 21/4622* (2013.01)

(58) Field of Classification Search
CPC ....... G10K 11/17881; G10K 11/17885; G10K 2210/108; G10K 2210/1081; G10K 2210/3026; G10K 2210/3028; G10K 2210/3048; G10K 2210/3049; G10K 11/178; H04L 65/601; H04L 67/2842; H04S 2400/11; H04S 2400/15; H04S 3/008; H04S 7/301; H04W 24/00; H04W 64/003; G06K 9/00711; G06K 9/00315; G06K 9/00335; G06K 9/00577; G06K 9/00771; G06K 9/00899; G11B 27/10; G11B 27/28; H04R 1/406; H04R 3/005; H04R 1/1083; H04R 2201/401; H04R 2410/05; H04R 5/033; A63F 13/10; A63F 13/12; A63F 13/25; A63F 13/95; A63F 2300/206; A63F 2300/535; G01C 21/206; G06Q 30/0255; H04N 21/42203; H04N 21/4394; H04N 21/436; H04N 21/4622; H04N 21/6582; H04N 21/4104; H04N 21/4131; H04N 21/43615; H04N 21/442; H04N 21/44227; H04N 21/462; H04N 7/106; H04N 21/44204; H04N 21/44213; H04N 21/44222; H04N 21/4781; H04N 21/8358; H04N 21/8456; H04N 21/233; H04N 21/235; H04N 21/2387; H04N 21/4126; H04N 21/42204; H04N 21/426; H04N 21/42646; H04N 21/4333; H04N 21/435; H04N 21/44008; H04N 21/44218; H04N 21/4436; H04N 21/4524; H04N 21/4532; H04N 21/81; H04N 21/8106; H04N 21/8352; H04N 21/84; H04N 21/8547; H04N 21/8549; H04N 21/8586; H04N 5/232; H04N 5/4401; H04N 5/4403; H04N 5/775; H04N 5/783; H04N 5/85; H04N 7/173; H04N 7/17327; H04N 9/8042; H04N 9/8205; H04N 21/43635; H04N 5/268; H04N 5/765; H04H 2201/90; H04H 60/37; H04H 60/58; H04H 2201/50; H04H 60/33; H04H 60/39; H04H 60/41; H04H 60/44; H04H 60/56; H04H 60/59; H04H 60/65; H04H 60/66; G10L 19/018; G10L 25/51; G10L 25/18; G10L 25/48; G10L 21/055; G10L 25/06; G01S 5/18; G01S 19/48; G01S 3/7864; G01S 3/8083; G01S 5/02; G01S 5/14; G01S 5/186; G01S 5/22; G01S 5/28; G01S 5/30; G06F 16/683; G06F 16/583; G06F 16/95; G06F 21/32; G06F 3/165

See application file for complete search history.

(56) References Cited

U.S. PATENT DOCUMENTS

| | | | |
|---|---|---|---|
| 5,504,518 A | 4/1996 | Ellis et al. | |
| 5,572,246 A | 11/1996 | Ellis et al. | |
| 5,612,729 A | 3/1997 | Ellis et al. | |
| 5,621,454 A | 4/1997 | Ellis et al. | |
| 6,112,053 A | 8/2000 | Dunki-Jacobs et al. | |
| 6,532,445 B1 | 3/2003 | Toguri et al. | |
| 6,675,383 B1 | 1/2004 | Wheeler et al. | |
| 6,766,523 B2 | 7/2004 | Herley | |
| 6,799,199 B1 | 9/2004 | Segal et al. | |
| 7,080,253 B2 | 7/2006 | Weare | |
| 8,006,258 B2 | 8/2011 | Ramaswamy | |
| 8,098,152 B2 | 1/2012 | Zhang et al. | |
| 8,731,212 B2 | 5/2014 | Takahashi et al. | |
| 9,641,892 B2 | 5/2017 | Panger et al. | |
| 10,349,123 B2 * | 7/2019 | Panger | H04N 21/4622 |
| 11,039,204 B2 | 6/2021 | Panger et al. | |
| 2001/0005823 A1 | 6/2001 | Fischer et al. | |
| 2002/0097885 A1 | 7/2002 | Birchfield et al. | |
| 2003/0038710 A1 | 2/2003 | Manis et al. | |
| 2003/0095667 A1 * | 5/2003 | Watts | H04R 3/005 |
| | | | 381/98 |
| 2005/0117753 A1 | 6/2005 | Miura et al. | |
| 2005/0135637 A1 | 6/2005 | Obranovich et al. | |
| 2007/0006275 A1 | 1/2007 | Wright et al. | |
| 2007/0168409 A1 | 7/2007 | Cheung | |
| 2007/0192782 A1 * | 8/2007 | Ramaswamy | H04N 21/426 |
| | | | 725/15 |
| 2008/0300702 A1 | 12/2008 | Gomez et al. | |
| 2009/0012638 A1 | 1/2009 | Lou | |
| 2009/0037575 A1 | 2/2009 | Crystal et al. | |
| 2011/0276157 A1 * | 11/2011 | Wang | H04L 65/75 |
| | | | 700/94 |
| 2011/0307085 A1 * | 12/2011 | Selby | G10L 25/18 |
| | | | 700/94 |
| 2012/0102515 A1 | 4/2012 | Ramaswamy | |
| 2013/0162905 A1 | 6/2013 | Matsumoto et al. | |
| 2013/0163781 A1 | 6/2013 | Thyssen et al. | |
| 2014/0155104 A1 | 6/2014 | Jarvis et al. | |
| 2014/0307899 A1 | 10/2014 | Hendrix et al. | |
| 2015/0178487 A1 | 6/2015 | Hu et al. | |
| 2017/0208359 A1 | 7/2017 | Panger et al. | |
| 2018/0025741 A1 | 1/2018 | Tcheng | |

OTHER PUBLICATIONS

International Searching Authority, "Written Opinion", mailed in connection with International Patent Application No. PCT/US2014/068201, dated Mar. 18, 2015, 5 pages.

International Searching Authority, "International Preliminary Report on Patentability," mailed in connection with International Patent Application No. PCT/US2014/068201, dated Jan. 17, 2017, 6 pages.

United States Patent and Trademark Office, "Non-Final Office Action," mailed in connection with U.S. Appl. No. 14/332,005, dated Jan. 13, 2016, 10 pages.

United States Patent and Trademark Office, "Non-Final Office Action," mailed in connection with U.S. Appl. No. 14/332,005, dated Jul. 28, 2016, 11 pages.

United States Patent and Trademark Office, "Notice of Allowance," mailed in connection with U.S. Appl. No. 14/332,005, dated Dec. 22, 2016, 15 pages.

United States Patent and Trademark Office, "Notice of Allowance," mailed in connection with U.S. Appl. No. 15/476,450, dated Feb. 25, 2019, 12 pages.

United States Patent and Trademark Office, "Final Office Action," mailed in connection with U.S. Appl. No. 15/476,450, dated Nov. 16, 2018, 10 pages.

(56) References Cited

OTHER PUBLICATIONS

United States Patent and Trademark Office, "Non-final Office Action," mailed in connection with U.S. Appl. No. 15/476,450, dated Mar. 8, 2018, 11 pages.

United States Patent and Trademark Office, "Non-final Office Action," mailed in connection with U.S. Appl. No. 16/502,426, dated Aug. 22, 2019, 12 pages.

United States Patent and Trademark Office, "Non-final Office Action," mailed in connection with U.S. Appl. No. 16/502,426, dated Apr. 22, 2020, 13 pages.

United States Patent and Trademark Office, "Final Office Action," mailed in connection with U.S. Appl. No. 16/502,426, dated Oct. 28, 2020, 7 pages.

United States Patent and Trademark Office, "Notice of Allowance," mailed in connection with U.S. Appl. No. 16/502,426, dated Feb. 10, 2021, 13 pages.

\* cited by examiner

FREQUENCY BAND SELECTION AND PROCESSING TECHNIQUES FOR MEDIA SOURCE DETECTION

RELATED APPLICATION(S)

This patent arises from a continuation of U.S. patent application Ser. No. 16/502,426 (now U.S. Pat. No. 11,039,204), which is titled "FREQUENCY BAND SELECTION AND PROCESSING TECHNIQUES FOR MEDIA SOURCE DETECTION" and which was filed on Jul. 3, 2019, which is a continuation of U.S. patent application Ser. No. 15/476,450 (now U.S. Pat. No. 10,349,123), which is titled "FREQUENCY BAND SELECTION AND PROCESSING TECHNIQUES FOR MEDIA SOURCE DETECTION" and which was filed on Mar. 31, 2017, which is a continuation of U.S. patent application Ser. No. 14/332,005 (now U.S. Pat. No. 9,641,892), which is titled "FREQUENCY BAND SELECTION AND PROCESSING TECHNIQUES FOR MEDIA SOURCE DETECTION" and which was filed on Jul. 15, 2014. Priority to U.S. patent application Ser. Nos. 16/502,426, 15/476,450 and 14/332,005 is claimed. U.S. patent application Ser. Nos. 16/502,426, 15/476,450 and 14/332,005 are hereby incorporated by reference in their respective entireties.

FIELD OF THE DISCLOSURE

This disclosure relates generally to media source detection and, more particularly, to frequency band selection and processing techniques for media source detection.

BACKGROUND

Some media monitoring systems employ media source detection to determine which of several media sources is providing media being presented by a monitored media device. For example, in a typical home environment, a television may be communicatively coupled to several different media sources, such as, but not limited to, a set-top box (STB), a digital versatile disk (DVD) player, a Blu-ray Disk™ player, a gaming console, a computer, etc., capable of providing media for presentation by the television. Accurate detection of the active media source providing the media presented by the monitored media device enables reliable identification of the media and, thus, accurate crediting of audience exposure to the media.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
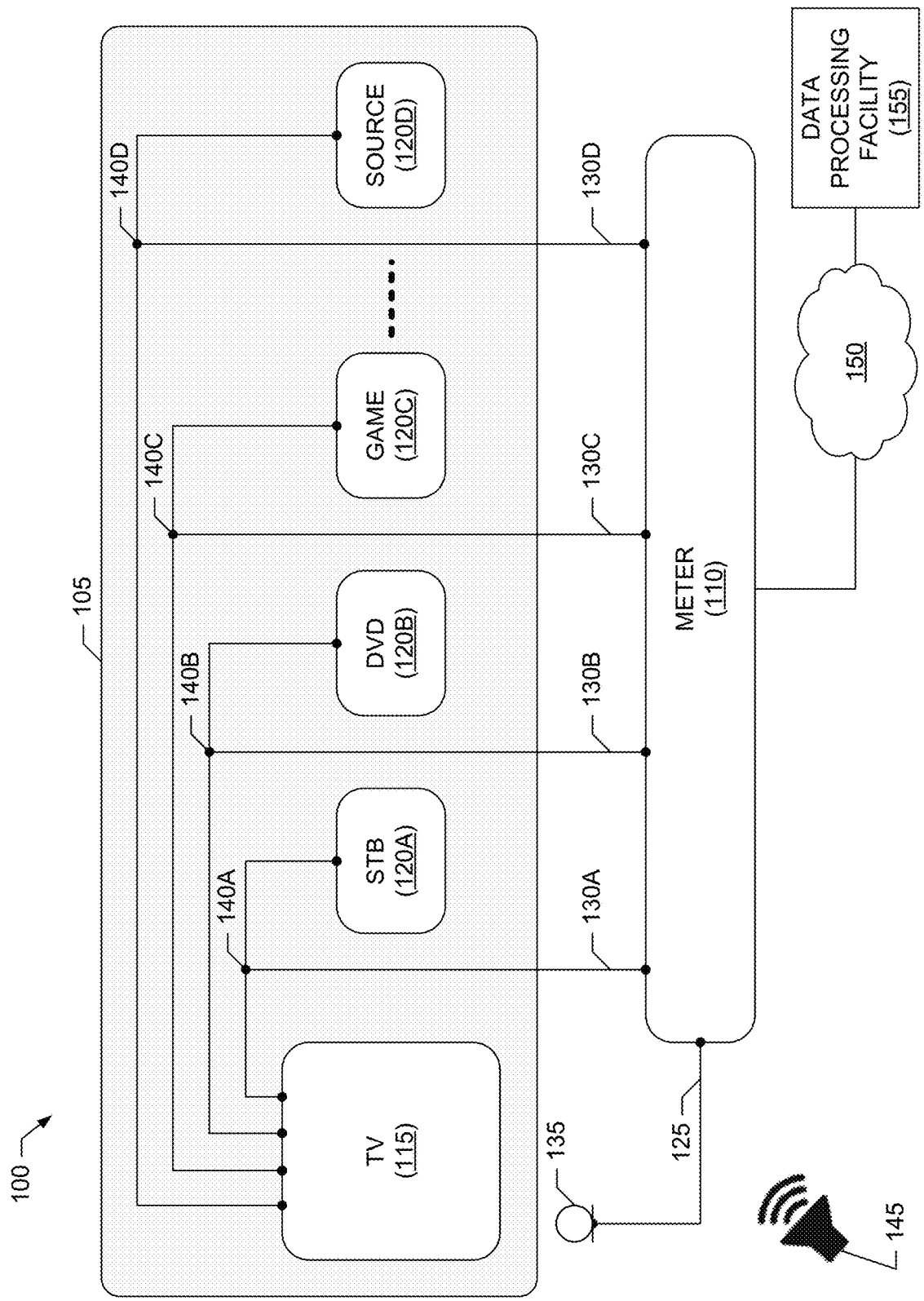
FIG. 1 is a block diagram of an example monitored site including an example home entertainment system monitored by an example meter employing frequency band selection and processing techniques for media source detection as disclosed herein.

Media source detection techniques employing frequency band selection and processing are disclosed herein. Media source detection involves determining which of several possible media sources provided media presented by a monitored media device. As noted above, accurate detection of the active media source providing the media presented by the monitored media device enables reliable identification of the media and accurate crediting of audience exposure to the media. However, a technical problem in prior media monitoring systems is that the accuracy of media source detection can be reduced due to, for example, ambient noise degrading the audio signal captured from the monitored media device. Example media source detection techniques employing frequency band selection and processing as disclosed herein provide technical solutions to this technical problem and, thus, are able to mitigate the effects of ambient noise and improve media source detection accuracy relative to prior systems.

Example media source detection methods disclosed herein, which are able to provide such technical solutions, include determining first trending coefficients for a first audio signal obtained from a first media source in communication with a media device, with the first trending coefficients corresponding to a set of frequency bands. Such example media source detection methods disclosed herein also include determining second trending coefficients for a second audio signal obtained from monitoring media presented by the media device, with the second trending coefficients corresponding to the set of frequency bands. For example, the first audio signal may be obtained from an audio line output of the first media source, whereas the second audio signal may be obtained from a microphone arranged to sense audio emanating from one or more speakers of or associated with the media device. Such example media source detection methods disclosed herein further include selecting a subset of the frequency bands for which the first trending coefficients and the second trending coefficients have matching directions, and processing respective frequency band values of the first audio signal and respective frequency band values of the second audio signal for the subset of the frequency bands to determine whether the first media source provided the media presented by the media device.

In some disclosed example methods, determining the first trending coefficients for the first (e.g., media source) audio signal includes determining first frequency band values of the first audio signal for the set of frequency bands, with the first frequency band values corresponding to a first time. Such example methods also include determining second frequency band values of the first audio signal for the set of frequency bands, with the second frequency band values corresponding to a second time later than the first time. Such example methods further include determining the first trending coefficients to be ratios of the second frequency band values and the first frequency band values. In some such example methods, the second trending coefficients for the second (e.g., media device) audio signal are determined in a similar manner. In some such example methods, a first one of the first (e.g., media source) trending coefficients corresponding to a first one of the frequency bands and a first one of the second (e.g., media device) trending coefficients corresponding to the same first one of the frequency bands have matching directions if (1) the first one of the first trending coefficients is greater than one and the first one of the second trending coefficients is greater than one, or (2) the first one of the first trending coefficients is less than or equal to one and the first one of the second trending coefficients is less than or equal to one.

In some disclosed example methods, a first one of the first (e.g., media source) trending coefficients corresponding to a first one of the frequency bands and a first one of the second (e.g., media device) trending coefficients corresponding to the same first one of the frequency band have matching directions if (1) both the first one of the first trending coefficients and the first one of the second trending coefficients satisfy a threshold value, or (2) both the first one of the first trending coefficients and the first one of the second trending coefficients do not satisfy the threshold value.

In some disclosed example methods, the subset of the frequency bands is a first subset of the frequency bands, and selecting the first subset of the frequency bands includes selecting a second subset of the frequency bands for which the first trending coefficients and the second trending coefficients have matching directions. Such example methods also include determining a first number of the second subset of the frequency bands having values of the first trending coefficients that most closely match respective values of the second trending coefficients for the second subset of the frequency bands. Such example methods further include selecting the first subset of the frequency bands from the first number of the second subset of the frequency bands.

In some disclosed example methods, processing the respective frequency band values of the first (e.g., media source) audio signal and the respective frequency band values of the second (e.g., media device) audio signal for the subset of the frequency bands includes cross-correlating the respective frequency band values of the first audio signal and the respective frequency band values of the second audio signal for respective ones of the subset of the frequency bands to determine correlation results for the respective ones of the subset of the frequency bands. Such example methods also include combining the correlation results for the respective ones of the subset of the frequency bands to determine a match result associated with the first media source. Such example methods further include comparing the match result to a threshold to determine whether the first media source provided the media presented by the media device. Some such disclosed example methods additionally include determining a set of match results associated with the first media sources over a time period. Such example methods also include determining time delays associated with the match results, and comparing a standard deviation of the time delays to a second threshold to further determine whether the first media source provided the media presented by the media device.

These and other example methods, apparatus, systems and articles of manufacture (e.g., physical storage structures) to implement frequency band selection and processing for medias source detection are disclosed in greater detail below.

FIG. 1 is a block diagram of an example monitored site 100 including an example home entertainment system 105 monitored by an example meter 110 employing frequency band selection and processing techniques for media source detection as disclosed herein. The home entertainment system 105 of the illustrated example includes an example media device 115 in communication with several example media sources 120A-D. The example media sources 120A-D include, but are not limited to, an example set-top box (STB) 120A, an example digital versatile disk (DVD) player 120B, and example game console 120C, etc. The components of the example home entertainment system 105 may be connected in any manner, including that shown in FIG. 1. For example, one or more of the media sources 120A-D may be communicatively coupled to the media device 115 via cabled connections, such as high definition multimedia interface (HDMI) cables, audio cables, etc. In some examples, one or more of the media sources 120A-D may be communicatively coupled to the media device 115 via analog and/or digital wireless connections.

In the illustrated example of FIG. 1, the STB 120A can be any set-top box, such as a cable television converter, a direct broadcast satellite (DBS) decoder, an over-the-air (OTA) digital television (DTV) receiver, etc., which receives a plurality of broadcast channels from a broadcast source.

Typically, the STB 120A selects one of the plurality of broadcast channels based on a user input, and outputs one or more signals received via the selected broadcast channel. In the case of an analog signal, the STB 120A may tune to a particular channel to obtain programming delivered on that channel. For a digital signal, the STB 120A may tune to a channel and decode packets of data to obtain programming delivered on the selected channel. For example, the STB 120A may tune to a major channel and then extract a program carried on a minor channel within the major channel. In some examples, the STB 120A includes digital video recorder (DVR) functionality to support time-shifted presentation of the media provided by the STB 120A. DVR functionality implemented by the STB 120A may include, for example, delaying presentation of broadcast media, fast-forwarding and rewinding the broadcast media, pausing the broadcast media, recording the broadcast media for later presentation (e.g., while watching other media being broadcast on another channel), etc.

In the illustrated example of FIG. 1, the DVD player 120B can be any type of DVD player, Blu-ray Disk™ player, optical disk player, etc. In some examples, the DVD player 120B may provide advanced functionality, such as being able to download streaming media from one or more sources accessible via the Internet.

In the illustrated example of FIG. 1, the game console 120C can be any device capable of playing a video game. In some examples, the game console 120C is a dedicated gaming console, such as Microsoft's Xbox One™, Nintendo's Wii™, Sony's PlayStation™, etc. In some examples, the game console 120C is a portable gaming device, such as Nintendo's GameBoy™, DS™), etc. In some examples, the game console 120C is a personal computer, a laptop computer, a tablet computer (e.g., an iPad™), etc.

In the illustrated example of FIG. 1, the media device 115 is depicted as a television, but the media device 115 can be, more generally, any type of media presenting device. For example, the media device 115 may be a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. In some examples, the media device 115 may be a multimedia computer system, a tablet computer (e.g., an iPad™), a smartphone, etc.

The monitored site 100 of the illustrated example also includes the example meter 110 to monitor the media presented by the media device 115. An aspect of media monitoring implemented by the example meter 110 of FIG. 1 is media source detection. In the illustrated example, the meter 110 implements media source detection employing frequency band selection and processing, as disclosed herein, to identify which one of the example media sources 120A-D is actively providing the media being presented by the media device 115. To perform media source detection, the example meter 110 monitors audio signals output by the media device 115 and the media sources 120A-D. As such, the example meter 110 includes an example media device input 125 to receive an audio signal corresponding to the media device 115, and example source inputs 130A-D to receive audio signals corresponding to respective ones of the media sources 120A-D. In some examples, the media device input 125 is also referred to as a reference input 125 because the audio signal obtained from the media device 115 can be considered a reference audio signal to be compared against the audio signals from the media sources 120A-D.

In some examples, such as the example illustrated in FIG. 1, the meter 110 employs an example microphone 135 and/or other audio/acoustic sensor to non-invasively capture audio emanating from the speaker(s) of the media device 115 (or from separate speaker(s), such as those of a home theater system, being driven by the media device). In the illustrated example, the microphone 135 captures an audio signal from the media device 115 and provides it to the reference input 125 of the meter 110. In the illustrated example of FIG. 1, the source inputs 130A-D of the meter 110 receive audio signals from the media sources 120A-D via wired (e.g., cabled) connections. For example, the source inputs 130A-D may be audio line inputs communicatively coupled to respective ones of the media sources 120A-D via example splitters 140A-D, as shown. Because the audio signals obtained via the reference input 125 and the source inputs 130A-D may take different audio paths (e.g., via the microphone 135 vs. via direct cabled connections), there may be delays between the reference audio signal obtained for the media device 115 and the source audio signals obtained for the media sources 120A-D. Accordingly, when comparing the media device audio signal obtained via the reference input 125 with the source audio signals obtained via the source inputs 130A-D, the meter 110 of the illustrated example accounts for signal shifts over an allowed delay range, such from −1 second to +5 seconds, or any other appropriate range.

In the illustrated example of FIG. 1, the meter 110 determines metering data that includes, among other things, media source detection results identifying which media source 120A-D provided the media presented by the media device 115 at successive monitoring times (also referred to herein as media source detection times). The monitoring times (media source detection times) may occur at regular intervals (e.g., such as intervals of 5 sec., 15 sec., 30 sec., 1 min., 2 min., etc.), in response to one or more events, etc. The meter 110 of the illustrated example stores and reports its metering data via an example network 150 to an example data processing facility 155. The data processing facility 155 performs any appropriate post-processing of the metering data to, for example, determine audience ratings information, identify targeted advertising to be provided to the monitored site 100, etc. In the illustrated example, the network 150 can correspond to any type(s) and/or number of wired and/or wireless data networks, or any combination thereof.

As shown in the illustrated example of FIG. 1, the reference (e.g., media device) audio signal processed by the meter 110 is obtained via the microphone 135, whereas the media source signals to be compared to this reference audio signal are obtained via the line inputs 130A-D. However, in many operating environments, the reference (e.g., media device) audio signal captured via the microphone 135 may be affected (e.g., degraded) by ambient noise 145, such as background noise, conversations between audience members in the vicinity of the media device 115, dogs barking, machinery, etc. To mitigate the effects of the ambient noise 145, the meter 110 employs frequency band selection and processing techniques for media source detection, as disclosed in further detail below, which can improve media source detection accuracy relative to prior media monitoring systems.

Although the example meter 110 of FIG. 1 is depicted as having one reference input 125 and four source inputs 130A-D, the meter 110 is not limited thereto. For example, the meter 110 of the illustrated example can be configured to have any number of reference inputs 125 and/or any number of source inputs 130A-D. Also, the example meter 110 of FIG. 1 is not limited to the reference input 125 being received from the microphone 135 or the source inputs 130A-D being line inputs (or the source audio signals being received via cabled connections). For example, the meter 110 of the illustrated example can be configured to receive the reference (e.g., media device) audio signal at the reference input 125 via a cabled connection and/or receive the source audio signal(s) at one or more of the source inputs 130A-D via microphone(s), audio/acoustic sensor(s), frequency probes, etc. More generally, the frequency band selection and processing techniques for media source detection disclosed herein can be used in almost any scenario in which a good (e.g., original) audio signal is being compared to another audio signal that may have acquired additional, unwanted audio energy.

Figure 2:
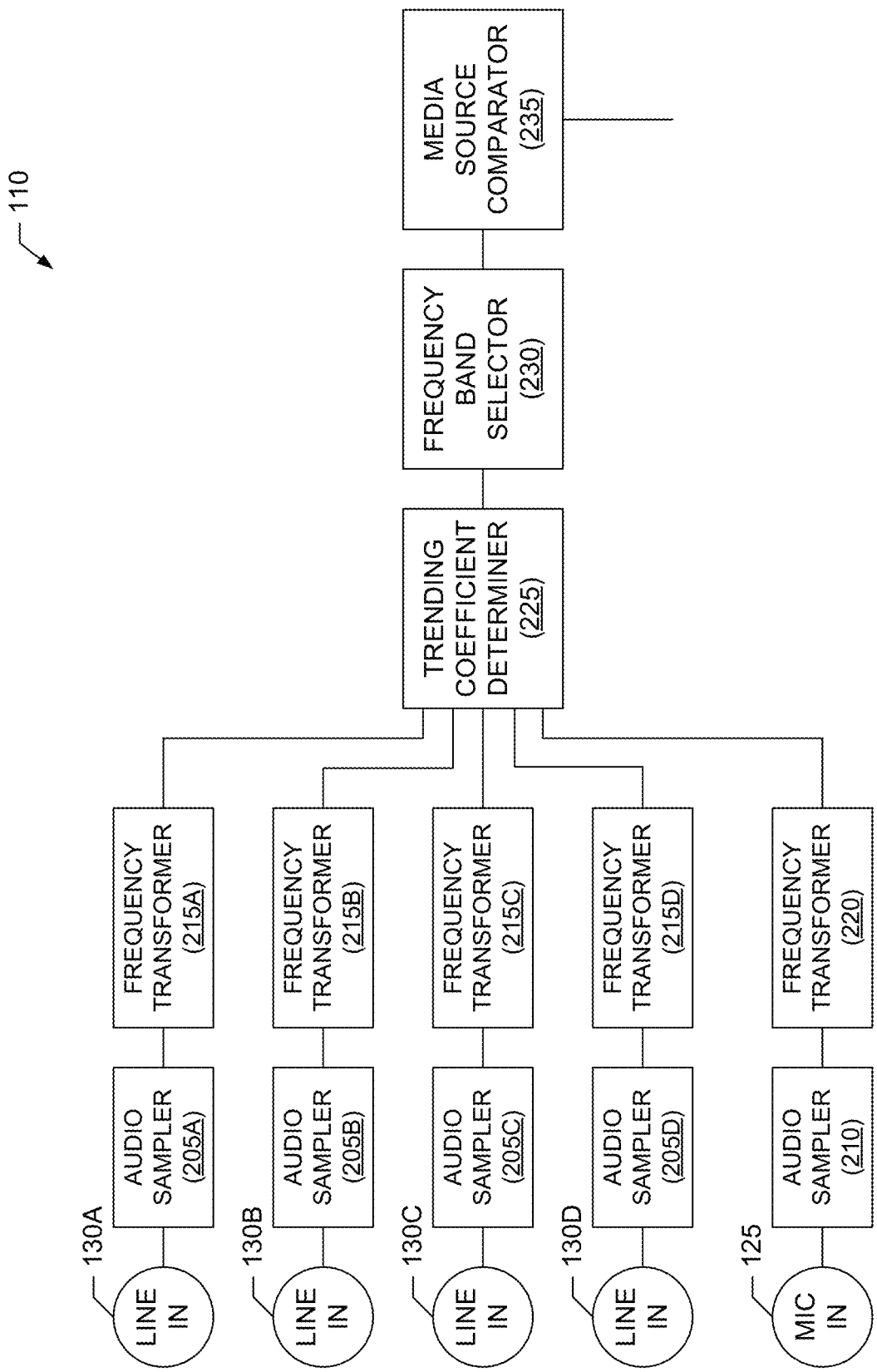
FIG. 2 is a block diagram depicting an example implementation of the meter of FIG. 1.

A block diagram depicting an example implementation of the meter 110 of FIG. 1 is illustrated in FIG. 2. In the illustrated example of FIG. 2, the processing performed by the example meter 110 is divided into several stages, which begin with sampling the audio obtained via the source inputs 130A-D and the reference (e.g., media device) input 125, and end with a media source detection result. In some examples, the media source detection results include a pairwise media device/media source match result expressed as a correlation value (e.g., such as a percentage) and a delay (e.g., in milliseconds) between the matching media device and media source audio signals.

Turning to FIG. 2, the example meter 110 illustrated therein includes example audio samplers 205A-D to sample the source audio signals obtained at the source inputs 130A-D of the meter 110. The example meter 110 of FIG. 2 also includes an example audio sampler 210 to sample the reference (e.g., media device) audio signal obtained at the reference input 125 of the meter 110. In the illustrated example, each of the audio samplers 205A-D and 210 sample their respective input audio signals at a sampling rate of 16 kHz with 16 bit resolution, but other sampling rates and/or data resolutions can alternatively be used. In some examples, the audio samplers 205A-D and 210 are implemented as separate samplers operating in parallel, whereas in other examples, one or more (or all) of the audio samplers 205A-D and 210 may be implemented by a single sampler cycling through sampling of the different audio signals.

In the illustrated example of FIG. 2, the meter 110 includes example frequency transformers 215A-D to transform the sampled source audio signals obtained from the audio samplers 205A-D into frequency domain representations of the respective source audio signals. The example meter 110 of FIG. 2 also includes an example frequency transformer 220 to transform the sampled reference (e.g., media device) audio signal obtained from the audio sampler 210 into a frequency representation (or frequency transform) of the reference (e.g., media device) audio signal. In the illustrated example, the frequency transformers 215A-D and 220 each implement a 512-point Fast Fourier Transform (FFT) to yield respective frequency transforms of their respective audio signals having 256 frequency bins having bin widths (or spacing) of 31.25 Hz. However, in other examples, the frequency transformers 215A-D and 220 may implement other size FFTs and/or other type(s) of transforms to yield frequency representations having different numbers of bins, different bin width/spacing, etc.

As noted above, in some examples, the audio samplers 205A-D and 210 sample their respective input audio signals in parallel. In some such examples, the sampling frequencies of the respective audio samplers 205A-D and 210 may not be synchronized. In such examples, one or more techniques may be used by the audio samplers 205A-D and 210 to maintain alignment between the sampled audio signals, and thereby avoid introducing an artificial delay between the signals. For example, the audio samplers 205A-D and 210 may implement alignment by tracking the position of the most recent audio samples in the respective audio buffers maintained by the audio samplers 205A-D and 210. Then, when retrieving audio segments for processing by the frequency transformers 215A-D and 220, the audio segments are taken starting backwards from the tracked positions of the most recent audio samples in the respective audio buffers. This ensures that the successive processing stages of the example meter 110 are processing the latest available audio from the reference (e.g., media device) input 125 and each of the source inputs 130A-D.

The example meter 110 of FIG. 2 further includes an example trending coefficient determiner 225 to determine trending coefficients for each of the source audio signals obtained via the source inputs 130A-D and for the reference (e.g., media device) audio signal obtained via the reference input 125. In the illustrated example, for a given input audio signal, the trending coefficient determiner 225 determines a set of trending coefficients corresponding respectively to a set of frequency bands by processing the frequency transform of the given input audio signal (e.g., as determined by the frequency transformers 215A-D and 220). For example, the trending coefficient determiner 225 of the illustrated example determines a first set of trending coefficients for a first audio signal obtained via the source input 130A for a first media source, wherein the first set of trending coefficients correspond respectively to a set of frequency bands. The example trending coefficient determiner 225 also determines a second set of trending coefficients for the reference (e.g., media device) audio signal obtained via the reference input 125, wherein the second set of trending coefficients correspond respectively to the same set of frequency bands for which the first set of trending coefficients (for the first media source) are determined. The trending coefficient determiner 225 further determines respective sets of trending coefficients for the media source audio signals obtained via the other source inputs 130B-D, with the respective sets of trending coefficients also corresponding to the same set of frequency bands. As disclosed in further detail below, the trending coefficients determined by the trending coefficient determiner 225 are used to select (e.g., dynamically) frequency bands of the reference (e.g., media device) audio signal and source audio signals for further processing.

Figure 3:
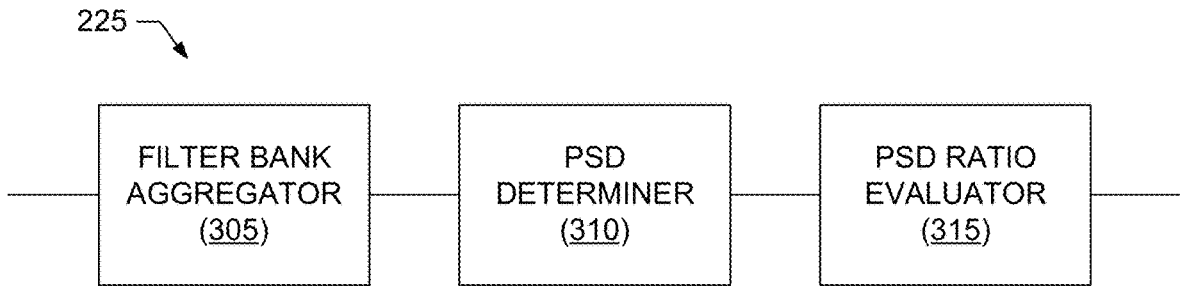
FIG. 3 is a block diagram of an example trending coefficient determiner that may be used to implement the example meters of FIGS. 1 and/or 2.

A block diagram depicting an example implementation of the trending coefficient determiner 225 of FIG. 2 is illustrated in FIG. 3. Turning to FIG. 3, the example trending coefficient determiner 225 illustrated therein includes an example filter bank aggregator 305 to aggregate the FFT bins of the frequency transforms determined by the frequency transformers 205A-D and 210 into frequency bands, also referred to as frequency banks. (In some examples, a filter bank refers to a collection of FFT bins spanning a given frequency band. For convenience, the terms filter bank and frequency band are used interchangeably herein.) In the illustrated example, the filter bank aggregator 305 aggregates the 256 FFT bins of the frequency transforms determined by the frequency transformers 205A-D and 210 into 32 frequency bands (or frequency banks) ranging from a low frequency ($F_{low}$) of 400 Hz to a high frequency ($F_{high}$) of 8000 Hz (or 8 kHz). The high frequency of 8000 Hz is determined by the Nyquist sampling rule (e.g., assuming an audio sampling rate of 16 kHz) and the low frequency of 400 Hz is based on the frequency characteristics of the media device 115 being monitored. However, in other examples, the filter bank aggregator 305 can aggregate the same or a different number of input FFT bins into the same or a different number of frequency bands (filter banks), and over the same or different frequency range.

In the illustrated example of FIG. 3, the filter bank aggregator 305 follows a constant filter quality rule, also referred to as a constant Q rule, for determining the different frequency bands. For example, the filter bank aggregator 305 of FIG. 3 can use Equation 1 to determine the boundaries between different filter bands (banks):

$$\text{frequency bank boundary}_i = F_{low} \cdot \left(\frac{F_{high}}{F_{low}}\right)^{\frac{i}{banks}}, \quad \text{Equation 1}$$

In Equation 1, $F_{low}$ is the lowest frequency of the filter bank (e.g., 400 Hz), $F_{high}$ is the highest frequency of the filter bank (e.g., 8000 Hz), banks is the number of frequency bands (filter banks) (e.g., 32), and i ranges from 0 to the value of banks.

The example filter bank aggregator 305 of FIG. 3 uses Equation 1 to determine frequency bands (filter banks) having a flat frequency response and delimited by two frequency boundaries, a lower boundary and an upper boundary. For example, the filter bank aggregator 305 determines the lower boundary ($F_{l,i}$) and an upper boundary ($F_{h,i}$) for the $i^{th}$ frequency band (filter bank) using the following set of equations represented by Equation 2:

$$F_{l,i} = F_{low} \cdot \left(\frac{F_{high}}{F_{low}}\right)^{\frac{i}{banks}}, \text{ and} \quad \text{Equation 2}$$

$$F_{h,i} = F_{low} \cdot \left(\frac{F_{high}}{F_{low}}\right)^{\frac{i+1}{banks}}.$$

In Equation 2, i ranges from 0 to (banks−1), to yield a number of filter bands (filter banks) equal to the value of banks.

In some examples, when aggregating the FFT bins of the frequency transform of a given audio signal into the frequency bands (filter banks) having boundaries determined according to Equation 2, the filter bank aggregator 305 overlaps the cut-off point between adjacent frequency bands (filter banks) by one FFT bin. This can provide a smoother transition between adjacent frequency bands (filter banks), and can reduce the sensitivity to FFT resolution errors. For example, a slight offset in sampling frequency might result in the energy of a frequency component in one FFT frequency band (filter bank) spilling over into an adjacent FFT bin. By overlapping the cut-off point between adjacent frequency bands (filter banks) by one FFT bin, this spillover energy can still be included (at least partially) in the proper band (bank).

Figure 4:
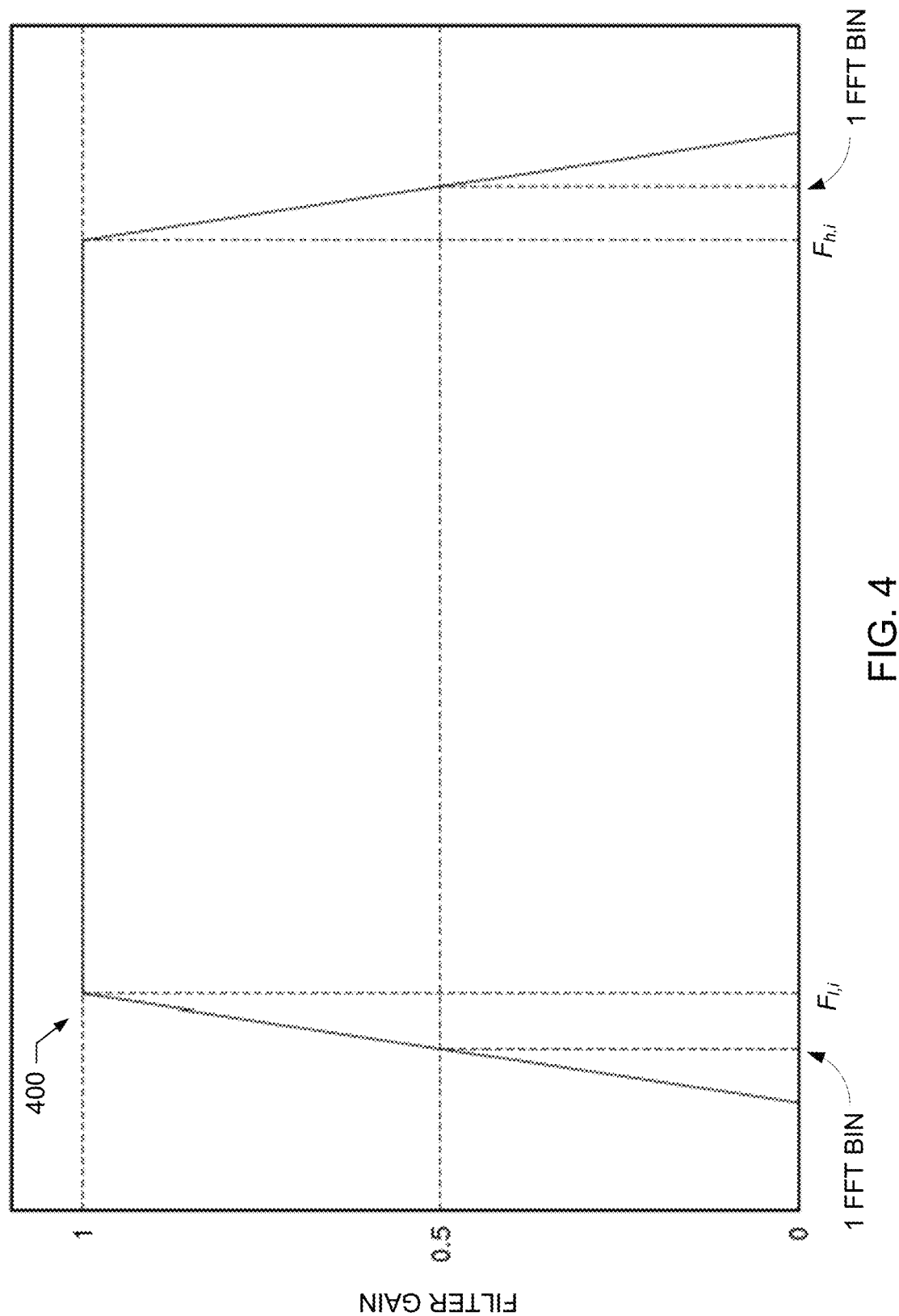
FIG. 4 illustrates an example frequency band determined by the example trending coefficient determiner of FIG. 3.
Figure 5:
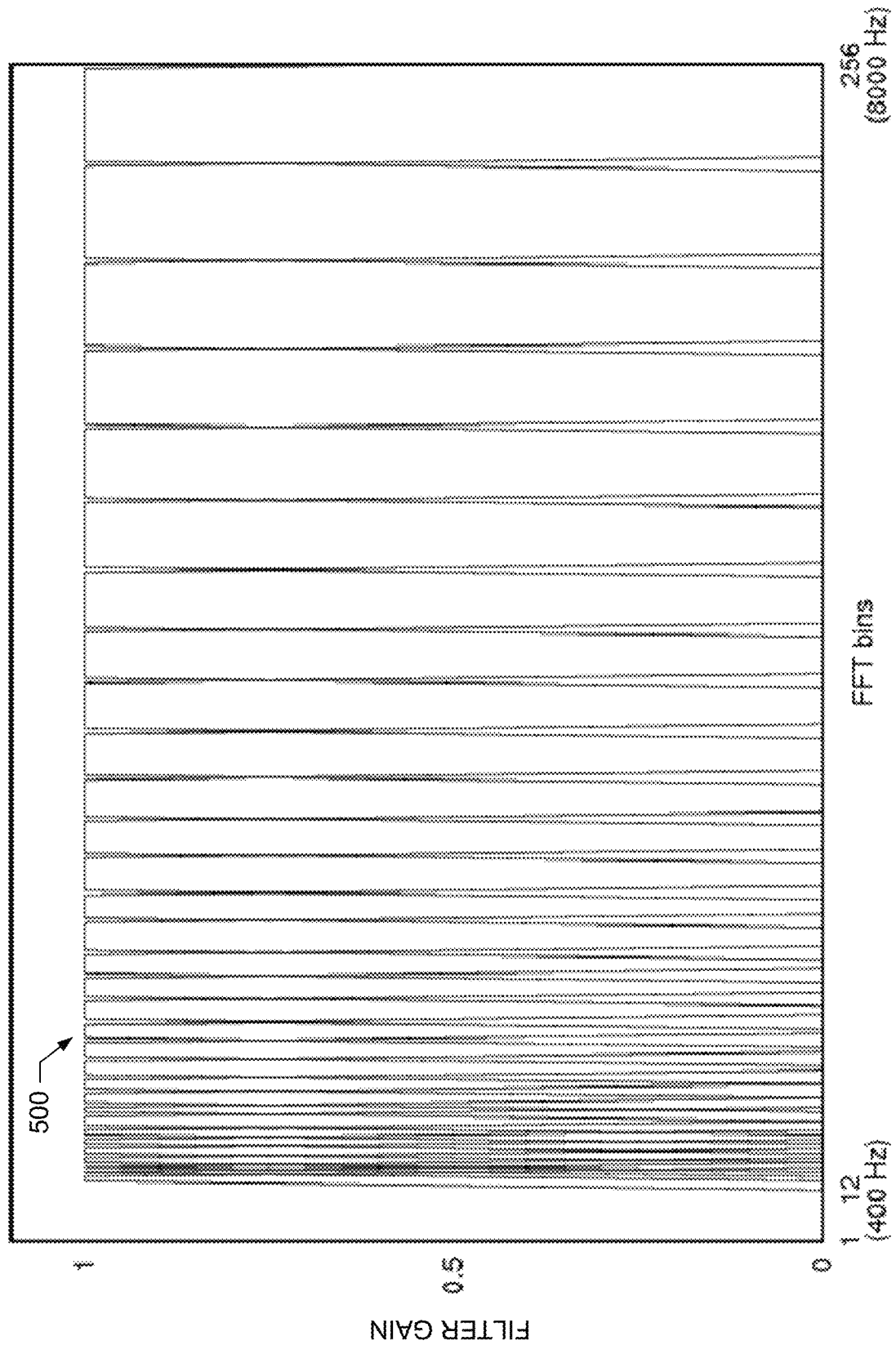
FIG. 5 illustrates an example filter bank including a group of example frequency bands determined by the example trending coefficient determiner of FIG. 3.

In some examples, the overlapping of adjacent frequency bands (filter banks) for frequency band i (or filter bank i) is constructed by applying a gain factor (e.g., a gain of 0.5 or some other value ≤1) to the next lower FFT bin before the lower boundary ($F_{l,i}$) of the $i^{th}$ band (bank), and applying a gain factor (e.g., a gain of 0.5 or some other value ≤1) to the next higher FFT bin after the higher boundary ($F_{h,i}$) of the $i^{th}$ band (bank). The resulting frequency response for the $i^{th}$ frequency band (filter bank) is illustrated by the example filter bank frequency response 400 depicted in FIG. 4. An example of an overall set of frequency bands (filter banks) determined by the example filter bank aggregator 305 using Equation 1 and Equation 2, and with the overlapping illustrated in the example of FIG. 4, is illustrated by the example filter bank response 500 depicted in FIG. 5. The example filter bank response 500 depicted in FIG. 5 includes 32 frequency bands (filter banks) starting at 400 HZ and ending at 8000 Hz, and exhibits a logarithmic increase in the width of the frequency bands (filter banks) with increasing frequency.

Returning to FIG. 3, the illustrated example trending coefficient determiner 225 also includes an example PSD determiner 310 to determine, for the reference (media device) audio signal and source audio signals, respective frequency band values for the different frequency bands (filter banks) determined by the filter bank aggregator 305. For example, the PSD determiner 310 of the illustrated example determines a first set of frequency band values, which correspond to the set of frequency bands (filter banks) determined by the filter bank aggregator 305, for an audio signal obtained via the source input 130A for a first media source. The example PSD determiner 310 also determines a second set of frequency band values, which correspond to the same set of frequency bands (filter banks) determined by the filter bank aggregator 305, for the reference (e.g., media device) audio signal obtained via the reference input 125. The example PSD determiner 310 further determines respective sets of frequency band values, which correspond to the same set of frequency bands (filter banks) determined by the filter bank aggregator 305, for the media source audio signals obtained via the other source inputs 130B-D.

In the illustrated example of FIG. 3, the frequency band values determined by the PSD determiner 310 are power spectral density (PSD) values. However, other types of frequency band values may be determined by the PSD determiner 310 in other examples. For example, the PSD determiner 310 can determine the frequency band values for a given audio signal and frequency band (filter bank) to be a PSD value by summing the magnitude values (or squared magnitude values) of the FFT bins for the given audio signal that are included in the given frequency band (filter bank) (e.g., after multiplying by an appropriate filter gain, such as a gain of 0.5 for an overlapping FFT bin or a gain of 1 for a non-overlapping FFT bin). Stated mathematically, the PSD determiner 310 of the illustrated example determines the frequency band value for the $i^{th}$ frequency band (filter bank) of a given audio signal by summing the FFT bin values of the given audio signal according to Equation 3, which is:

$$PSD_i = \sum_{j=1}^{256} FFT_j \cdot G_{i,j}. \quad \text{Equation 3}$$

In Equation 3, $PSD_i$ is the frequency band value (e.g., PSD) for the $i^{th}$ frequency band (filter bank) of the given audio signal, FFT$_j$ is the value (e.g., magnitude, squared magnitude, etc.) of the $j^{th}$ FFT bin for the given audio signal, and $G_{i,j}$ is the filter bank gain coefficient to be applied to the value of the $j^{th}$ FFT bin to aggregate this bin into the $i^{th}$ frequency band (filter bank). For example, the filter bank gain coefficient $G_{1,1}$ can have a value of one (1) for FFT bins in the $i^{th}$ frequency band (filter bank), a value of zero (0) for FFT bins not in the $i^{th}$ frequency band (filter bank), and a value of 0.5 for FFT bins overlapping with the $i^{th}$ frequency band (filter bank).

Figure 6:
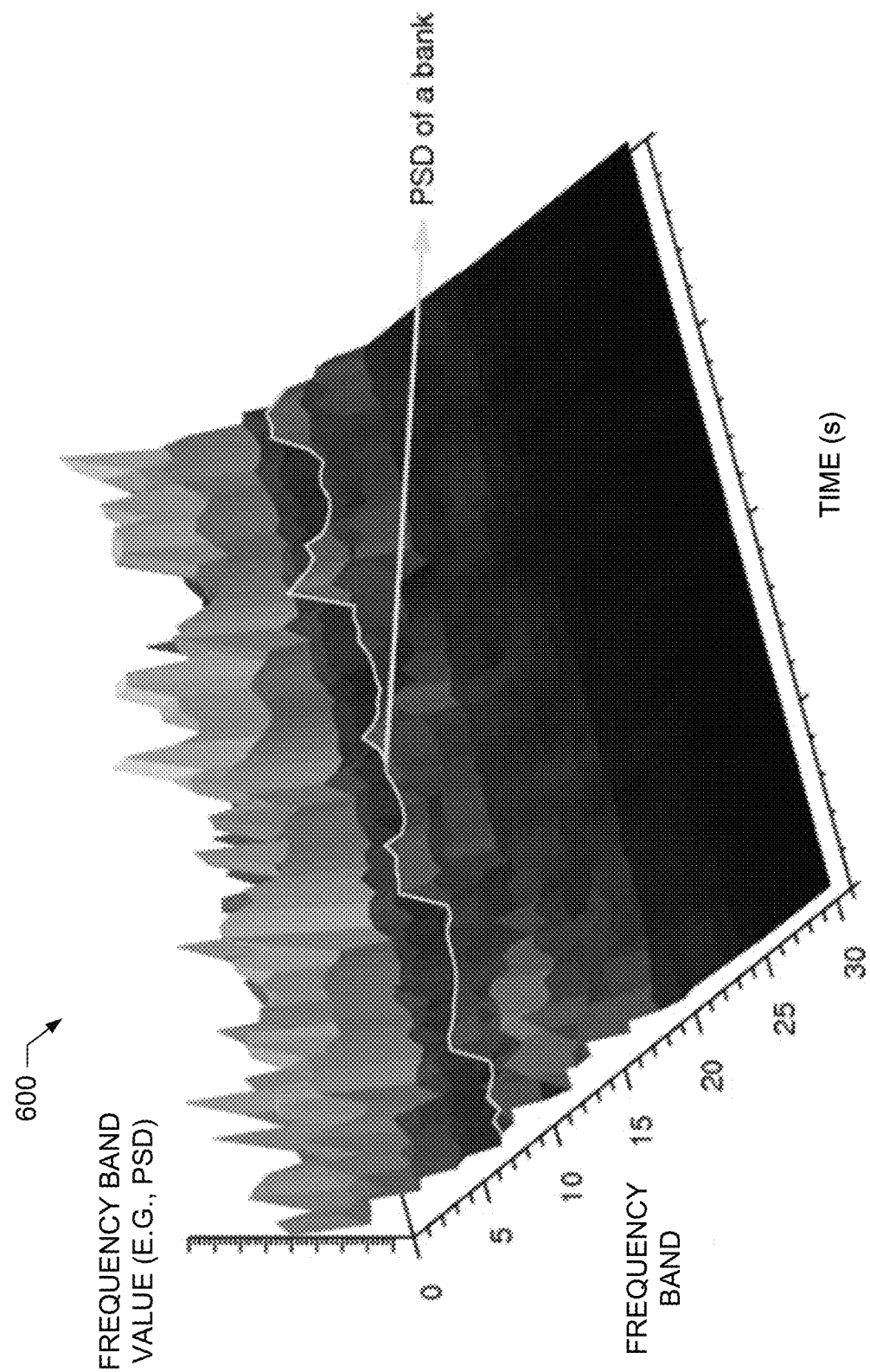
FIG. 6 illustrates an example power spectral density (PSD) determined by the example trending coefficient determiner of FIG. 3 for the example filter bank of FIG. 5.

The frequency band values (e.g., PSD values) determined by the PSD determiner 310 for a given audio signal and set of frequency bands (filter banks) for an audio spectrogram represent the variation of the audio signal in the different frequency bands over time. An example audio spectrogram 600 determined by the example PSD determiner 310 of FIG. 3 for an example input audio signal (e.g., corresponding to the reference (media device) audio signal or a media source audio signal) is illustrated in FIG. 6. The example audio spectrogram 600 depicts the frequency band values (e.g., PSD) values determined by the PSD determiner 310 for a given audio signal over a set of 32 frequency bands (filter banks) and for a duration of approximately 5 seconds.

In the illustrated example of FIG. 6, the $9^{th}$ frequency band (filter bank) is emphasized to show how the frequency band values (e.g., PSD values) of the band vary over time. The frequency band values (e.g., PSD values) of the different frequency bands (filter banks) of an audio signal vary depending on the characteristics of the audio. Additionally, in the case of an audio signal obtained by a microphone or other audio/acoustic sensor (e.g., such as the microphone 135), one or more of the different frequency bands (filter banks) may be affected by ambient noise (e.g., such as the ambient noise 145). When comparing the reference (e.g., media device) signal obtained via the microphone 135 to the audio signal obtained via the line inputs 130A-D from the matching media source 120A-D, the reference audio frequency bands (filter banks) not affected by ambient noise will have similar variations, or trends, as the same frequency bands (filter banks) of the source audio signal. However, the reference audio frequency bands (filter banks) affected by ambient noise will generally not have similar variations, or trends, as the same frequency bands (filter banks) of the source audio signal. Thus, the trending example coefficient determiner 225 processes the frequency band values (e.g., PSD values) of the reference (media device) audio signal and the source audio signals for a set of frequency bands (filter banks) to determining trending coefficients that characterize the variations, or trends, of the reference (media device) audio signal and the source audio signals in each of the frequency bands (filter banks). When comparing the reference (media device) audio signal to an audio signal from one of the media sources 120A-D, frequency bands (filter banks) having similar trending coefficients for the reference (media device) audio signal and the source audio signal are considered less likely to be corrupted by ambient noise, whereas frequency bands (filter banks) having different trending coefficients for the reference (media device) audio signal and the source audio signal are considered more likely to be corrupted by ambient noise.

Returning to FIG. 3, to determine the trending coefficients, the trending coefficient determiner 225 of the illustrated example further includes an example PSD ratio evaluator 315. The example PSD ratio evaluator 315 evaluates a ratio of successive frequency band values (e.g., PSD values) for a given audio signal (e.g., reference or source) in a given frequency band to determine a trending coefficient indicating whether the frequency band values (e.g., PSD values) for that audio signal in that band (bank) are increasing or decreasing, and by how much. Stated mathematically, for a given audio signal, the trending coefficient, for the $i^{th}$ frequency band (filter bank) at a given instant of time m can be determined by the example PSD ratio evaluator 315 using Equation 4, which is:

$$k_{i,m} = \frac{PSD_{i,m}}{PSD_{i,m-\Delta}}. \qquad \text{Equation 4}$$

In Equation 4, $PSD_{i,m}$ is the frequency band value (e.g., PSD) for the $i^{th}$ frequency band (filter bank) of the given audio signal at time m, and $PSD_{i,m-\Delta}$ is the frequency band value (e.g., PSD) for the $i^{th}$ frequency band (filter bank) of the given audio signal at time m−Δ. In the illustrated example, Δ corresponds to 32 milliseconds, which is the time interval between adjacent blocks of audio containing 512 samples sampled at a rate of 16 kHz. Thus, in the example of FIG. 3, the trending coefficient determiner 225 determines a new trending coefficients, $k_{i,m}$, for the frequency band (filter banks) of the given audio signal each time a new audio block is obtained, and the trending coefficients, $k_{i,m}$, represents how much the given band (bank) is varying between adjacent audio blocks. However, in other examples, the time difference, Δ, used in Equation 4 can be a different time difference, such as a time difference corresponding to multiple audio blocks, which results in the trending coefficients, $k_{i,m}$, represents how much the given band (bank) is varying between audio blocks spaced farther apart.

Figure 7:
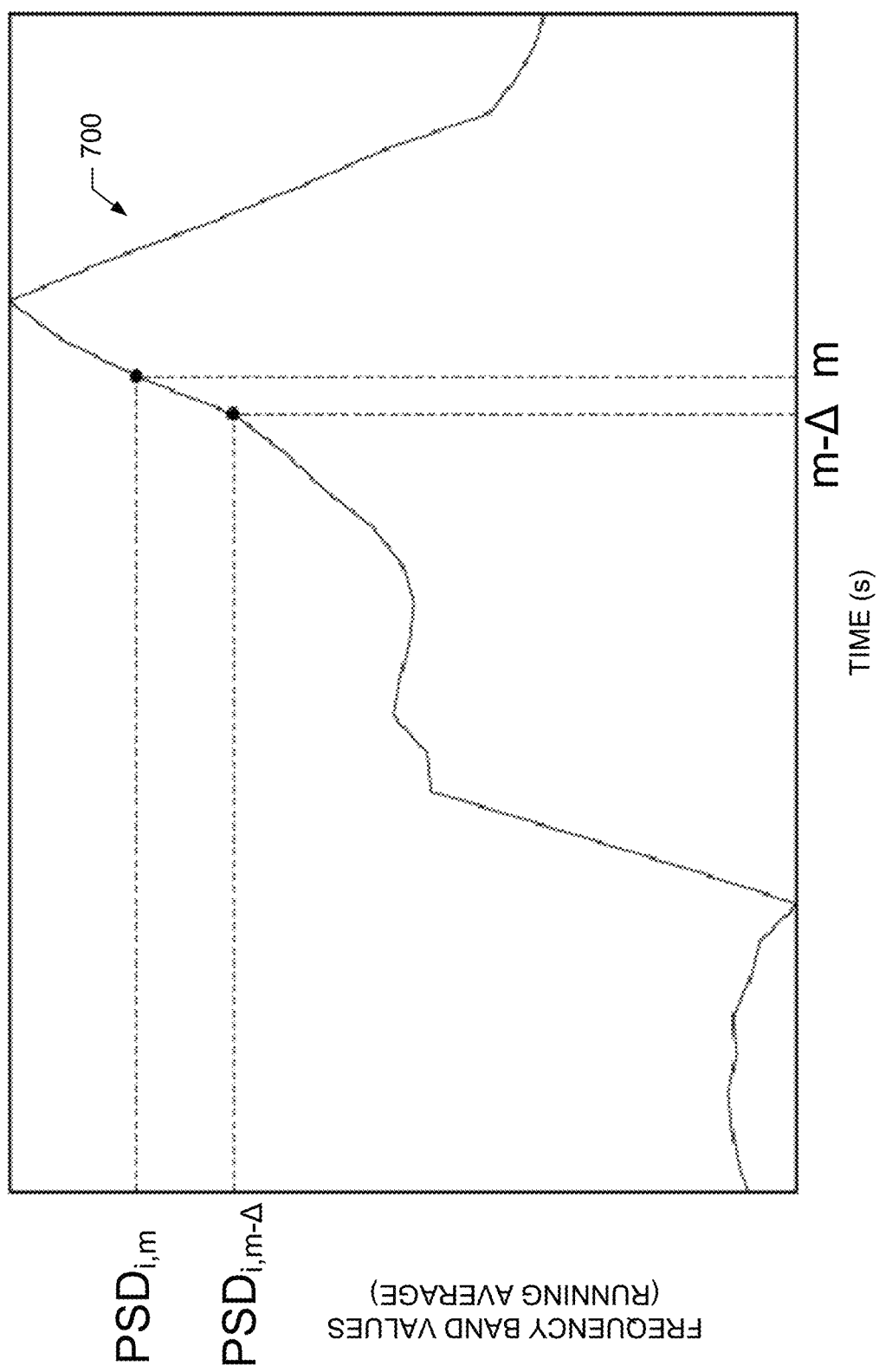
FIG. 7 illustrates an example variation of the example PSD of FIG. 6 for one frequency band in the example filter bank of FIG. 5, which may be represented by a trending coefficient determined by the example trending coefficient determiner of FIG. 3.

In some examples, the PSD determiner 310 determines the frequency band values of the set of frequency bands (filter banks) for a given audio signal as running averages (also referred to as a rolling average) of PSD values. For example, the PSD determiner 310 can include a window of PSD values in the running average, and update the running of PSD values each time a new audio block is obtained and transformed. In some examples, the PSD determiner 310 uses a window of 1024 ms for calculating the running average, which corresponds to 32 audio blocks when the audio blocks contain 512 audio samples sampled at a rate of 16 kHz. In other examples, other window sizes and update rates for the running average can be used. An example sequence of frequency band values 700 for a given frequency band (filter bank) determined by the PSD determiner 310 using a running average of PSD values is illustrated in FIG. 7. In examples in which the PSD determiner 310 determines frequency band values as running averages of PSD values, the frequency band values $PSD_{i,m}$ and $PSD_{i,m-\Delta}$ in Equation 4 correspond to the running average outputs at time m and m−Δ, respectively.

Returning to FIG. 2, the example meter 110 illustrated therein includes an example frequency band selector 230, which uses the trending coefficients determined by the example trending coefficient determiner 225 to select a subset of frequency bands (filter banks) to be used to perform pairwise comparisons between the reference (e.g., media device) audio signal and respective ones of the audio signals obtained from the media sources 120A-D. In the illustrated example, for a given reference (e.g., media device) audio signal and source audio signal pair, the frequency band selector 230 updates the selected subset of frequency bands (filter banks) to be used to perform the pairwise comparison when new trending coefficients are determined for the reference (e.g., media device) audio signal and/or the source audio signal. For example, the trending coefficients may be updated by the trending coefficient determiner 225 each time a new audio block is captured for the reference (e.g., media device) audio signal and/or the source audio signal (e.g., at a 32 ms rate in the examples described above) and, thus, the subset of frequency bands (filter banks) selected by the frequency band selector 230 for pairwise comparison may be updated at the same rate (e.g., 32 ms in the examples above). Furthermore, in some examples, different subsets of the frequency bands (filter banks) may be selected for different reference (e.g., media device) audio signal and source audio signal pairs. For example, at a given instance in time, the frequency band selector 230 may use the trending coefficients determined for the reference (e.g., media device) audio signal and a first source audio signal to select a first subset of the frequency bands (filter banks) for pairwise comparison of the reference (e.g., media device) audio signal and the first source audio signal, whereas the frequency band selector 230 may use the trending coefficients determined for the reference (e.g., media device) audio signal and a second source audio signal to select a different second subset of the frequency bands (filter banks) for pairwise comparison of the reference (e.g., media device) audio signal and the second source audio signal.

Figure 8:
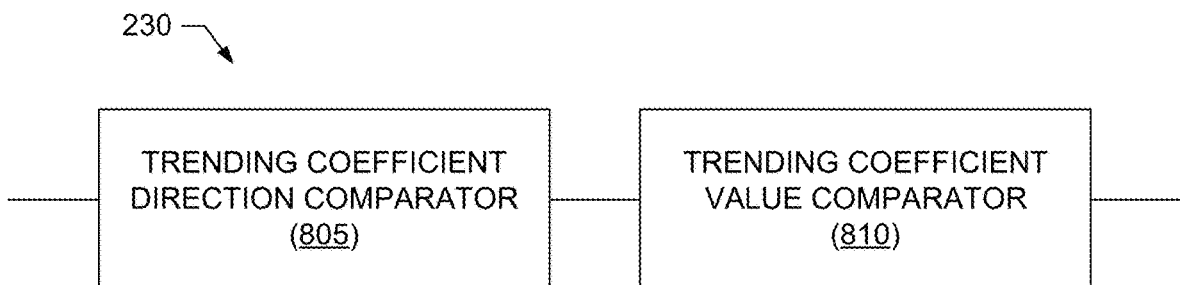
FIG. 8 is a block diagram of an example frequency band selector that may be used to implement the example meters of FIGS. 1 and/or 2.

A block diagram illustrated an example implementation of the frequency band selector 230 of FIG. 2 is illustrated in FIG. 8. Turning to FIG. 8, the example frequency band selector 230 illustrated therein includes an example trending coefficient direction comparator 805 to identify frequency bands (filter banks) for which the reference (e.g., media device) audio signal and a given one of the source audio signals have trending coefficients with matching directions. In some examples, a trending coefficient ($k_{i,m}$) of the reference (e.g., media device) audio signal for a given frequency band (filter bank) and a corresponding trending coefficient ($k_{i,m}$) of the given source audio signal for the same frequency band (filter bank) are determined to have the same direction if both trending coefficients satisfy a threshold value (e.g., both exceed a value of 1) or both trending coefficients do not satisfy the threshold value (e.g., both do not exceed a value of 1). Conversely, in such examples, the trending coefficient ($k_{i,m}$) of the reference (e.g., media device) audio signal and the corresponding trending coefficient ($k_{i,m}$) of the given source audio signal for the same frequency band (filter bank) are determined to have different directions if one of the trending coefficients satisfies the threshold value (e.g., exceed a value of 1), whereas the other one of the trending coefficients does not satisfy the threshold value (e.g., does not exceed a value of 1).

Stated mathematically, to identify a subset of frequency bands (filter banks) to be used to compare the reference (e.g., media device) audio signal and a given one of the source audio signals, the trending coefficient direction comparator 805 identifies those frequency bands (filter banks) satisfying Equation 5, which is:

bank is selected if: Equation 5

$$\begin{cases} k_{i,m} > T, & \text{for both the reference and source audio} \\ k_{i,m} \leq T, & \text{for both the reference and source audio} \end{cases}$$

In some examples, the threshold T in Equation 5 is a value of one (1), which cause the trending coefficient direction comparator 805 to select frequency bands (filter banks) for which the trending coefficients of the reference and source audio are either increasing (which corresponds to a value greater than 1) or decreasing (which corresponds to a value less than 1).

In some examples, the subset of frequency bands (filter banks) identified by the trending coefficient direction comparator 805 as having trending coefficients with matching directions for the reference (e.g., media device) audio signal and a given source audio signal are selected for use in a pairwise comparison of the reference (e.g., media device) audio signal and the given source audio signal to determine whether the signals match. In some examples, the example frequency band selector 230 of FIG. 8 also includes an example trending coefficient value comparator 810 to evaluate the subset (e.g., a first subset) of frequency bands (filter banks) identified by the trending coefficient direction comparator 805 as having trending coefficients with matching directions for the reference (e.g., media device) audio signal and the given source audio signal to further identify a second subset of frequency bands (filter banks) within the first subset that have the closest matching values. For example, if the first subset of frequency bands (filter banks) identified by the trending coefficient direction comparator 805 as having trending coefficients with matching directions for the reference (e.g., media device) audio signal and the given source audio signal exceeds a first number (e.g., such as 8 or some other number), then the trending coefficient value comparator 810 selects the first number (e.g., 8 or some other number) of frequency bands (filter banks) within the first subset having the closest matching values (e.g., in terms of absolute difference, ratio, etc.). In such examples, the second subset of frequency bands (filter banks) identified by the trending coefficient value comparator 810 as having trending coefficients with closest matching values for the reference (e.g., media device) audio signal and the given source audio signal are selected for use in the pairwise comparison of the reference (e.g., media device) audio signal and the given source audio signal to determine whether the signals match.

Returning to FIG. 2, the example meter 110 illustrated therein includes an example media source comparator 235, which uses the subset of frequency bands (filter banks) selected by the frequency band selector 230 for a given reference (e.g., media device) audio signal and source audio signal pair to perform a pairwise comparison of the reference and the given source signal to determine whether the source signal matches the reference (e.g., media device) signal. In the illustrated example, the media source comparator 235 uses the different subset of frequency bands (filter banks) selected for each of the different possible reference and source audio signal pairs to compare each source signal against the reference (e.g., media device) signal to identify which one of the media sources 120A-D is most likely the source of the media presented by the media device 115. More specifically, in the illustrated example, the media source comparator 235 processes the frequency band values of the reference (e.g., media device) audio signal and respective frequency band values of a given source audio signal for the respective ones of the selected subset of the frequency bands (filter banks) to determine whether a given media source 120A-D provided the media presented by the media device 115.

Figure 9:
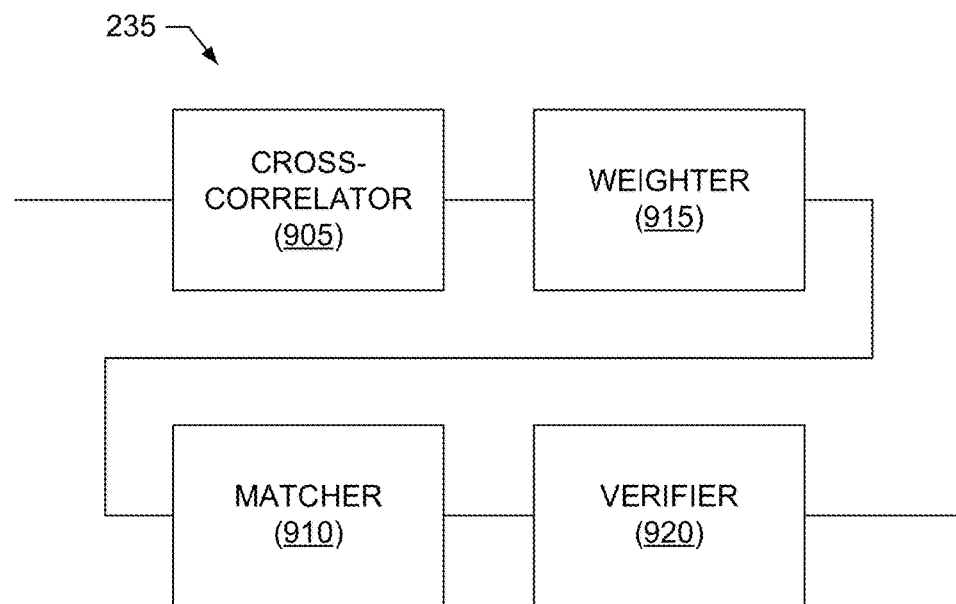
FIG. 9 is a block diagram of an example media source comparator that may be used to implement the example meters of FIGS. 1 and/or 2.

A block diagram illustrated an example implementation of the media source comparator 235 of FIG. 2 is illustrated in FIG. 9. Turning to FIG. 9, the example media source comparator 235 includes an example cross-correlator 905 to compare the subset of frequency bands selected for a given reference (e.g., media device) audio signal and source audio signal pair. More specifically, in the illustrated example, the cross-correlator 905 use cross-correlation to process the frequency band values of the reference (e.g., media device) audio signal and respective frequency band values of the given source audio signal for each one of the selected subset of the frequency bands (filter banks) to determine correlation results for each one of the selected subset of the frequency bands (filter banks). In general, stated mathematically, for the $i^{th}$ frequency band (filter bank) in the subset of frequency bands (filter banks) selected by the frequency band selector 230 for a given reference (e.g., media device) audio signal and source audio signal pair, the example cross-correlator 905 determines a correlation result ($c_i(n)$) by cross-correlating the frequency band values ($PSD\_REF_{i,m}$) of the reference (e.g., media device) audio signal with the frequency band values ($PSD\_SRC_{i,m}$) of the given source audio signal according to Equation 6, over all possible delays, n, which is:

$$c_i(n) = \sum_m \frac{(PSD\_REF_{i,m} - \overline{PSD\_REF_i})(PSD\_SRC_{i,m+n} - \overline{PSD\_SRC_i})}{(\sigma_{REF,i} \cdot \sigma_{SRC,i})}. \quad \text{Equation 6}$$

In Equation 6, the cross-correlation of the frequency band values is performed over a window of time delays (n) over a range, such as from −1 sec. to +5 sec., or some other range. In Equation 6, $\overline{PSD\_REF_i}$ is the average (or mean) of the frequency band values ($PSD\_REF_{i,m}$) of the reference (e.g., media device) audio signal for the $i^{th}$ frequency band (filter bank), $\overline{PSD\_SRC_i}$ is the average (or mean) of the frequency band values ($PSD\_SRC_{i,m}$) of the given source audio signal for the $i^{th}$ frequency band (filter bank), ($\sigma_{REF,i}$) is the standard deviation of the frequency band values ($PSD\_REF_{i,m}$) of the reference (e.g., media device) audio signal for the $i^{th}$ frequency band (filter bank), and ($\sigma_{SRC,i}$) is the standard deviation of the frequency band values ($PSD\_SRC_{i,m}$) of the given source audio signal for the $i^{th}$ frequency band (filter bank). The cross-correlation results ($c_i(n)$) determined by the cross-correlator 905 for each one of the subset of frequency bands (filter banks) have values in the range of $0 \leq c_i(n) \leq 1$. Also, the subset of frequency bands (filter banks) selected by the frequency band selector 230 for comparison is empty (e.g., because Equation 5 is not satisfied for any frequency band), then cross-correlation result is set to a value of 0. Thus, the cross-correlation results $c_i(n)$ can be interpreted as representing how close, in terms of a percentage, the reference (e.g., media device) and source audio signals match in each one of the subset of frequency bands (filter banks).

In some examples, in each selected frequency band, the cross-correlator 905 performs cross-correlation of the frequency band values for a given reference (e.g., media device) audio signal and source audio signal pair over some or all of the possible shifts (e.g., delays) between the frequency band values of the reference audio signal relative to the source audio signal, or vice versa. In some examples, the frequency band selector 230 may select a different subset of frequency bands (filter banks) for each of the different shifts (delays) evaluated by the cross-correlator 905.

The example media source comparator 235 also includes an example matcher 910 to combine the correlation results ($c_i(n)$) determined by the cross-correlator 905 for the subset of frequency bands (filter banks) selected for a given reference (e.g., media device) audio signal and source audio signal pair to determine an overall match result for the given reference and source signal pair. In some examples, the matcher 910 averages the correlation results ($c_i(n)$) for the subset of frequency bands (filter banks) to determine the overall match result for the given reference and source signal pair. Stated mathematically, in such examples, the matcher 910 determines the overall match for the given reference and source signal pair using Equation 7, which is:

$$c(n) = \frac{1}{N_{Subset}} \sum_{i=1}^{N_{Subset}} c_i(n). \quad \text{Equation 7}$$

In Equation 7, $N_{Subset}$ is the number of band (banks) included in the subset of frequency bands (filter banks) selected for the given reference (e.g., media device) audio signal and source audio signal pair. Also, the overall match (c(n)) for the given reference and source signal pair determined using Equation 7 has a value in the range of $0 \leq c(n) \leq 1$.

In examples in which the overall match result is determined according to Equation 7, each one of the subset of frequency bands (filter banks) contributes equally to the overall match result. However, in such examples, frequency bands (filter banks) with low energy or flat frequency responses contribute equally when compared with bands (banks) having high energy and/or that are dynamic. As such, in some examples, the media source comparator 235 further includes an example weighter 915 to weight the correlation results ($c_i(n)$) determined for the subset of frequency bands (filter banks) selected for a given reference (e.g., media device) audio signal and source audio signal pair before the correlation results are combiner by the example matcher 910.

In some examples, the weighter 915 bases the weights determined for respective bands (banks) in the subset of frequency bands (filter banks) on characteristics of the source signal being compared, and not on the reference (media device) signal being compared. Using the source signal and not the reference (media device) signal can be advantageous for several reasons. For example, if the source audio signal is obtained via a cabled connection, whereas the reference (media device) audio signal is obtained via the microphone 135, then the source audio signal may be substantially noise free, whereas the reference (media device) audio signal may be corrupted by ambient noise and/or distorted by the frequency response of the media device 115. In such examples, using characteristics of the reference (media device) signal, instead of the source audio signal, might result in weights that emphasize bands (banks) affected by the ambient noise and/or the frequency response of the media device 115, instead of emphasizing bands (banks) that can be used to identify the matching media source 120A-D.

In some examples, the weighter 915 determines the weights based solely on the energy (e.g., PSD energy) in the different bands (banks) of the subset of frequency bands (filter banks) selected for the given reference and source signal pair. However, using just the energy might favor monotone audio signals with relatively high energy (e.g., because a monotone audio signal is represented in the frequency domain as a constant value over time and, thus, its energy would be constant and constructively add over time). As such, in some examples, the weighter 915 determines the weights for different bands (banks) of the subset of frequency bands (filter banks) selected for the given reference and source signal pair as a combination of the energy of the band (bank) and a coefficient of variation determined for the band (bank). For example, the weighter 915 can determine the coefficient of variation ($CV_i$) for the $i^{th}$ frequency band (filter bank) according to Equation 8, which is:

$$CV_i = \frac{\sigma_{SRC,i}}{\overline{PSD\_SRC_i}^2}. \quad \text{Equation 8}$$

In Equation 8, $\sigma_{SRC,i}$ is the standard deviation of the frequency band values (PSD_SRC$_{i,m}$) of the given source audio signal for the i$^{th}$ frequency band (filter bank), and $\overline{PSD\_SRC_i}^2$ is the square of the average (or mean) value of the frequency band values (PSD_SRC$_{i,m}$) of the given source audio signal for the i$^{th}$ frequency band (filter bank). In such examples, the weighter 915 further determines the weight (w$_i$) for the i$^{th}$ frequency band (filter bank) according to Equation 9, which is:

$$w_i = \log_{10}(\overline{PSD\_SRC_i} \cdot CV_i).  \quad \text{Equation 9}$$

In some examples in which the media source comparator 235 includes the example weighter 915, the matcher 910 computes a weighted average of the correlation results (c$_i$(n)) for the subset of frequency bands (filter banks) to determine the overall match result for the given reference and source signal pair. Stated mathematically, in such examples, the matcher 910 determines the overall match for the given reference and source signal pair using Equation 10, which is:

$$c(n) = \frac{1}{N_{Subset}} \sum_{i=1}^{N_{Subset}} \frac{w_i c_i(n)}{\sum_{k=1}^{N_{Subset}} w_i}.  \quad \text{Equation 10}$$

In Equation 10, N$_{Subset}$ is the number of band (banks) included in the subset of frequency bands (filter banks) selected for the given reference (e.g., media device) audio signal and source audio signal pair. Also, the overall match (c(n)) for the given reference and source signal pair determined using Equation 10 has a value in the range of 0≤c(n)≤1.

In some examples, the matcher 910 of FIG. 9 performs an iterative matching process to determine the overall match (c(n)) for the given reference and source signal pair. In some such examples, in a first iteration, the matcher 910 determines the overall match (c(n)) for the given reference and source signal pair using, for example, Equation 7 or Equation 10. Then, the overall match (c(n)) is compared against the correlation results (c$_i$(n)) determined for respective ones of the subset of frequency bands (filter banks), and the band (bank) with the largest deviation (e.g., difference) from the overall match (c(n)) is excluded from further comparison. During the next iteration, the matcher 910 determines the overall match (c(n)) for the given reference and source signal pair using, for example, Equation 7 or Equation 10, but excluding the band (bank) identified in the preceding iteration. This iterative process continues for a number of iterations (e.g., 3 or some other value) until a remaining number (e.g., 5 or some other number) of the subset of frequency bands (filter banks) are included in the computation of the overall match (c(n)). The final, overall match (c(n)) is then determined by the matcher 910 using this remaining number of frequency bands (filter banks).

In the illustrated example of FIG. 9, the example matcher 910 of the example media source comparator 235 determines an overall match result (c(n)) for each possible reference (media device) and source audio signal pair. For each possible reference (media device) and source audio signal pair, the matcher 910 further determines whether the peak overall match result (c(n)) for a given reference (media device) and source audio signal pair satisfies (e.g., exceeds) a match detection threshold (e.g., 0.8 or 80%, or some other value) and, if so, the delay (time offset, n) corresponding to the peak overall match result. If the peak overall match result (c(n)) for a given reference (media device) and source audio signal pair crosses the threshold, the media source comparator 235 determines that the given media source is (or is likely to be) the source of the media being presented by the media device 115 for the current match detection time.

Figure 10:
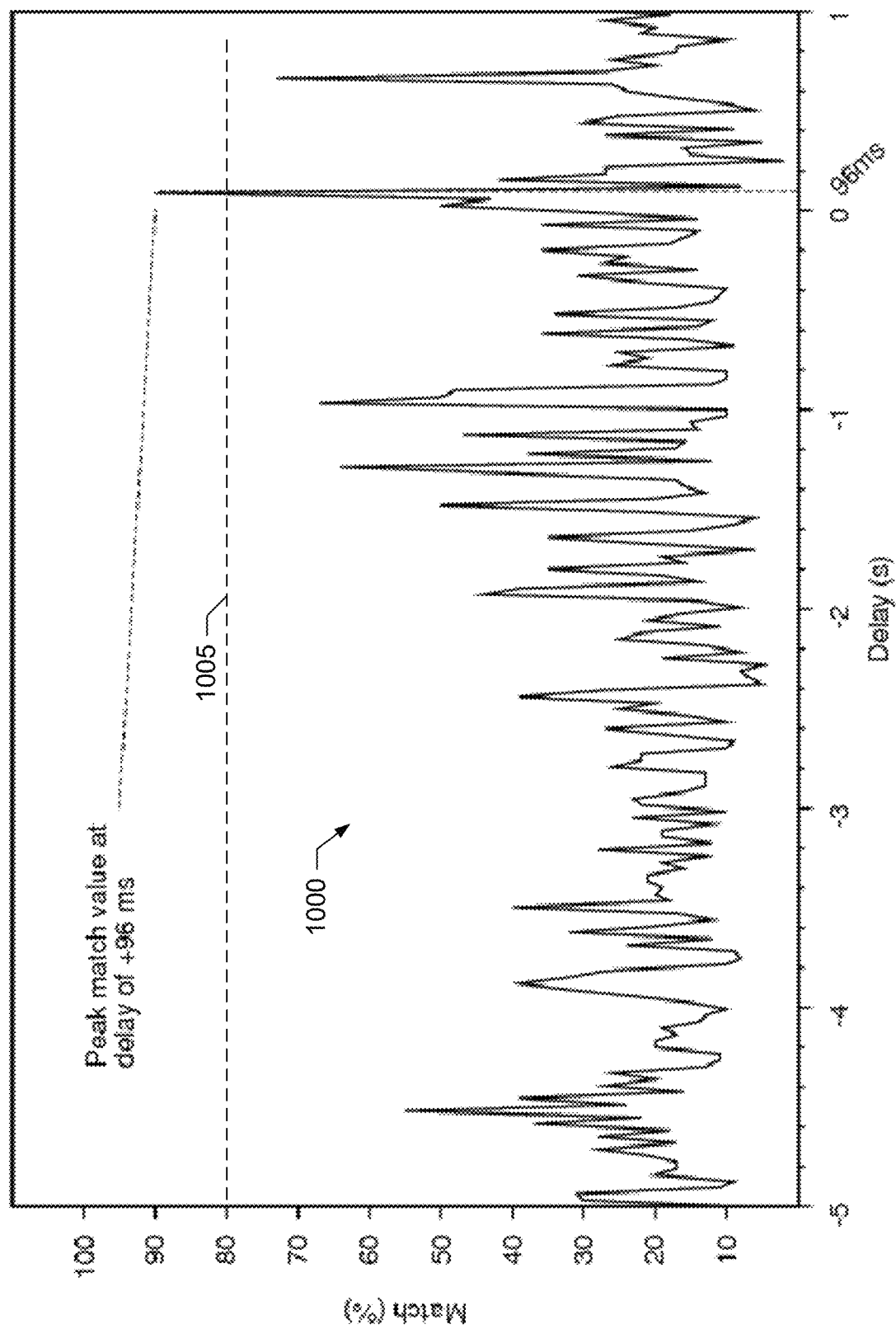
FIG. 10 illustrates and example source matching result output by the example media source comparator of FIG. 9 using a subset of frequency bands selected by the example frequency band selector of FIG. 8.

FIG. 10 illustrates and example overall match result 1000 output by the example matcher 910 of the example media source comparator 235 for a given reference (e.g., media device) and source audio signal pair using a subset of frequency bands selected by the example frequency band selector 230. In the illustrated example of FIG. 10, the overall match result 1000 is determined by the media source comparator 235 with shifts of 32 ms. over a range of −5 sec. to 1 sec., and has a peak value at a delay of +96 ms (e.g., corresponding to c(n) for n=−3). Furthermore, the peak value satisfies an example match detection threshold 1005. Accordingly, in the illustrated example of FIG. 10, the media source comparator 235 determines that the given media source 120A-D yielding the overall match result 1000 is (or is likely to be) the source of the media being presented by the media device 115 for the current match detection time.

In some operating scenarios, the overall match results (c(n)) for multiple possible reference (media device) and source audio signal pairs may satisfy (e.g., exceed) the match detection threshold at a current match detection time. Assuming that only one media source 120A-D is providing the media being presented by the media device 115 at a given time, one or more of these overall match results will correspond to a false match detection. Thus, in some examples, the media source comparator 235 of FIG. 9 further includes an example verifier 920 to verify the overall match results (c(n)) to attempt to reduce the possibility of false match detections. In some examples, the verifier 920 examines the delay (e.g., n) of successive overall match results (c(n)) for a given reference (media device) and source audio signal pair over a time period to verify the overall match results for the signal pair do not correspond to a false positive. The delays between the reference (media device) audio signal and the source audio signals from different media sources 120A-D may be different due to the different audio processing and/or propagation paths between the different media sources 120A-D and the media device 115. However, although the delays for the different media sources 120A-D may be different, the delay for a given media source 120A-D is generally fixed (or constant) over time, with minor fluctuations due to processing variations in the particular source 120A-D and/or the media device 115. Thus, the verifier 920 of the illustrated example observes the delay associated with successive overall match results (c(n)) for a given reference (media device) and source audio signal pair to determine whether the delay is stable, which is indicative of a true match detection, or varying (e.g., jittering), which is indicative of a false match detection.

In some examples, for a given reference (media device) and source audio signal pair, the example verifier 920 determines a standard deviation of the successive overall match results (c(n)) that satisfied (e.g., exceeded) the match detection threshold over a time period and discards the overall match results as a false positive match if the standard deviation is too great (e.g., exceeds a threshold delay, such as 5 time units (e.g., 5 units of 32 ms, which is 160 ms), or some other value). Otherwise, if the standard deviation of the successive overall match results (c(n)) that satisfied (e.g., exceeded) the match detection threshold over the time period are not too great (e.g., do not exceed the threshold delay), then the example verifier 920 retains the overall match results as a true positive match.

Figure 11:
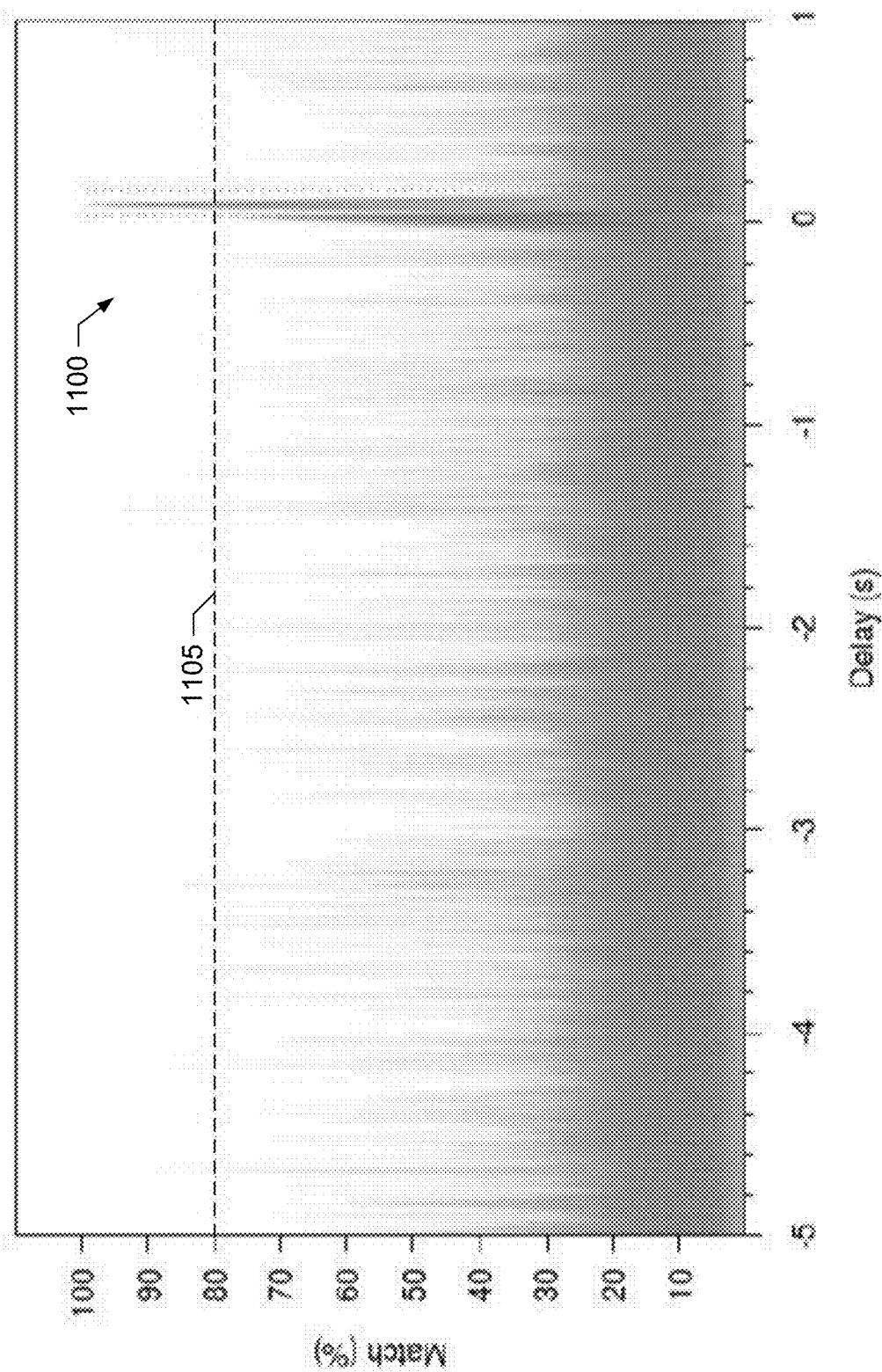
FIG. 11 illustrates an example deviation in the time delay associated with true positive match results determined by the example meters of FIGS. 1 and/or 2.

FIG. 11 illustrates an example deviation in the time delay associated with true positive match results determined by the example meter 110. In the illustrated example of FIG. 11, successive overall match results 1100 output by the matcher 910 of the example media source comparator 235 for a given reference (e.g., media device) and source audio signal pair which correspond to true positive source detections are overlaid on one another. Because the successive overall match results 1100 correspond to true positive match results, the peak overall match results (which satisfy an example detection threshold 1105) are tightly located within a threshold delay around an average time delay of +96 ms. (e.g., corresponding to c(n) for n=−3). Thus, in such an example, the verifier 920 of the example media source comparator 235 would determine that the values of the successive overall match results 1100 that satisfy the detection threshold 1105 have delays within the delay threshold and, as such, these match results correspond to a true positive detection match.

Figure 12:
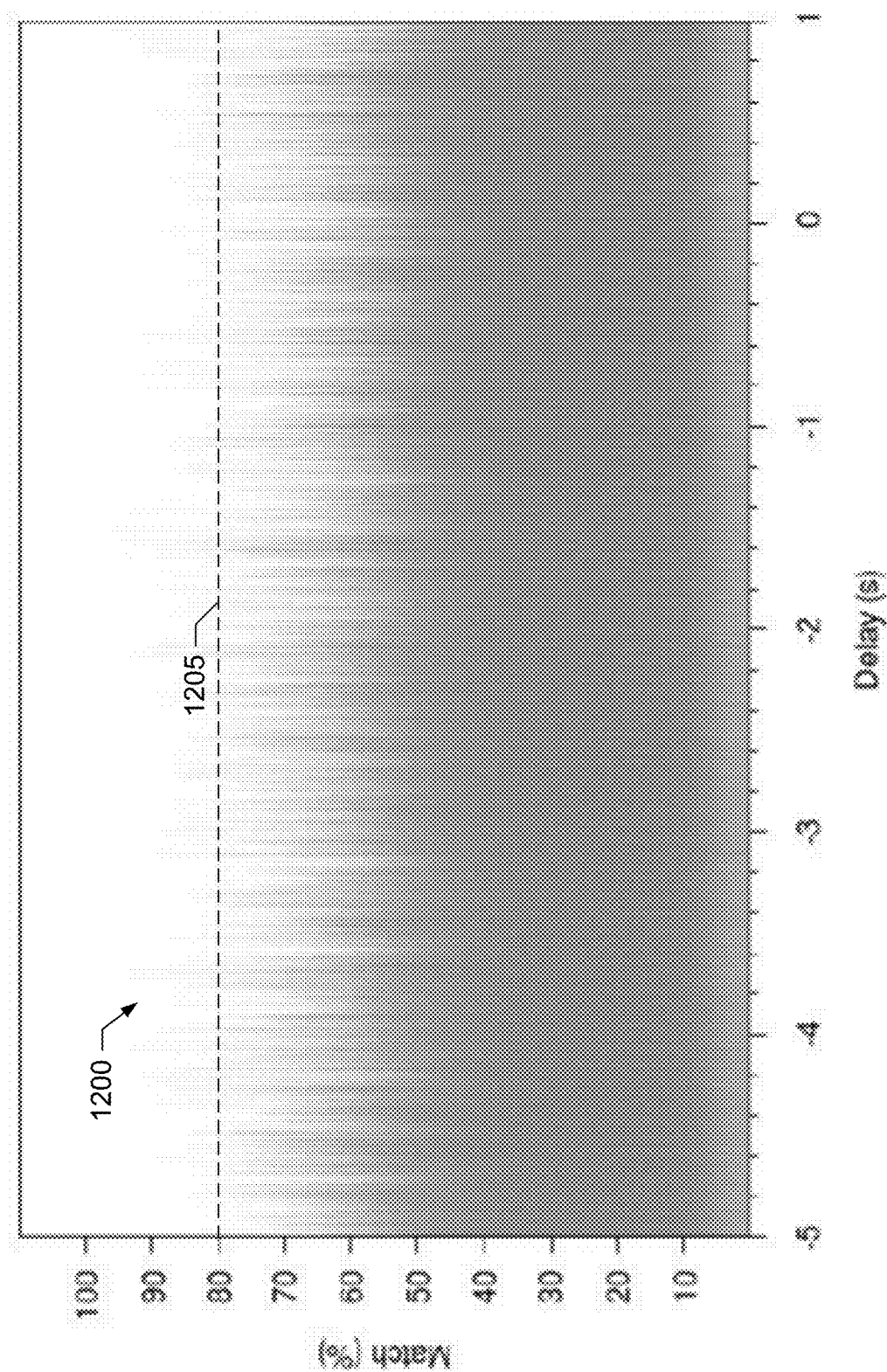
FIG. 12 illustrates an example deviation in the time delay associated with false positive match results determined by the example meters of FIGS. 1 and/or 2.

Conversely, FIG. 12 illustrates an example deviation in the time delay associated with false positive match results determined by the example meter 110. In the illustrated example of FIG. 12, successive overall match results 1200 output by the matcher 910 of the example media source comparator 235 for a given reference (e.g., media device) and source audio signal pair which correspond to false positive source detections are overlaid on one another. Because the successive overall match results 1200 correspond to false positive match results, the peak overall match results (which satisfy an example detection threshold 1205) are spread through the range of examined time delays. Thus, in such an example, the verifier 920 of the example media source comparator 235 would determine that the values of the successive overall match results 1200 that satisfy the detection threshold 1205 have delays exceeding the delay threshold and, as such, these match results correspond to false positive detection matches and are to be discarded.

While example manners of implementing the meter 110 of FIG. 1 are illustrated in FIGS. 2-12, one or more of the elements, processes and/or devices illustrated in FIGS. 2-12 may be combined, divided, re-arranged, omitted, eliminated and/or implemented in any other way. Further, the example audio samplers 205A-D, the example audio sampler 210, the example frequency transformers 215A-D, the example frequency transformer 220, the example trending coefficient determiner 225, the example frequency band selector 230, the example media source comparator 235, the example filter bank aggregator 305, the example PSD determiner 310, the example PSD ratio evaluator 315, the example trending coefficient direction comparator 805, the example trending coefficient value comparator 810, the example cross-correlator 905, the example matcher 910, the example weighter 915, the example verifier 920 and/or, more generally, the example meter 110 of FIGS. 1-12 may be implemented by hardware, software, firmware and/or any combination of hardware, software and/or firmware. Thus, for example, any of the example audio samplers 205A-D, the example audio sampler 210, the example frequency transformers 215A-D, the example frequency transformer 220, the example trending coefficient determiner 225, the example frequency band selector 230, the example media source comparator 235, the example filter bank aggregator 305, the example PSD determiner 310, the example PSD ratio evaluator 315, the example trending coefficient direction comparator 805, the example trending coefficient value comparator 810, the example cross-correlator 905, the example matcher 910, the example weighter 915, the example verifier 920 and/or, more generally, the example meter 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example meter 110, the example audio samplers 205A-D, the example audio sampler 210, the example frequency transformers 215A-D, the example frequency transformer 220, the example trending coefficient determiner 225, the example frequency band selector 230, the example media source comparator 235, the example filter bank aggregator 305, the example PSD determiner 310, the example PSD ratio evaluator 315, the example trending coefficient direction comparator 805, the example trending coefficient value comparator 810, the example cross-correlator 905, the example matcher 910, the example weighter 915 and/or the example verifier 920 is/are hereby expressly defined to include a tangible computer readable storage device or storage disk such as a memory, a digital versatile disk (DVD), a compact disk (CD), a Blu-ray disk, etc. storing the software and/or firmware. Further still, the example meter 110 may include one or more elements, processes and/or devices in addition to, or instead of, those illustrated in FIG. 1-12, and/or may include more than one of any or all of the illustrated elements, processes and devices.

Flowcharts representative of example machine readable instructions for implementing the example meter 110, the example audio samplers 205A-D, the example audio sampler 210, the example frequency transformers 215A-D, the example frequency transformer 220, the example trending coefficient determiner 225, the example frequency band selector 230, the example media source comparator 235, the example filter bank aggregator 305, the example PSD determiner 310, the example PSD ratio evaluator 315, the example trending coefficient direction comparator 805, the example trending coefficient value comparator 810, the example cross-correlator 905, the example matcher 910, the example weighter 915 and/or the example verifier 920 are shown in FIGS. 13A-B and 14-16. In these examples, the machine readable instructions comprise one or more programs for execution by a processor, such as the processor 1712 shown in the example processor platform 1700 discussed below in connection with FIG. 17. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 1712, but the entire program or programs and/or portions thereof could alternatively be executed by a device other than the processor 1712 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 13A-B and 14-16, many other methods of implementing the example meter 110, the example audio samplers 205A-D, the example audio sampler 210, the example frequency transformers 215A-D, the example frequency transformer 220, the example trending coefficient determiner 225, the example frequency band selector 230, the example media source comparator 235, the example filter bank aggregator 305, the example PSD determiner 310, the example PSD ratio evaluator 315, the example trending coefficient direction comparator 805, the example trending coefficient value comparator 810, the example cross-correlator 905, the example matcher 910, the example weighter 915 and/or the example verifier 920 may alternatively be used. For example, with reference to the flowcharts illustrated in FIGS. 13A-B and 14-16, the order of execution of the blocks may be changed, and/or some of the blocks described may be changed, eliminated, combined and/or subdivided into multiple blocks.

As mentioned above, the example processes of FIGS. 13A-B and 14-16 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 13A-B and 14-16 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

Figure 13A:
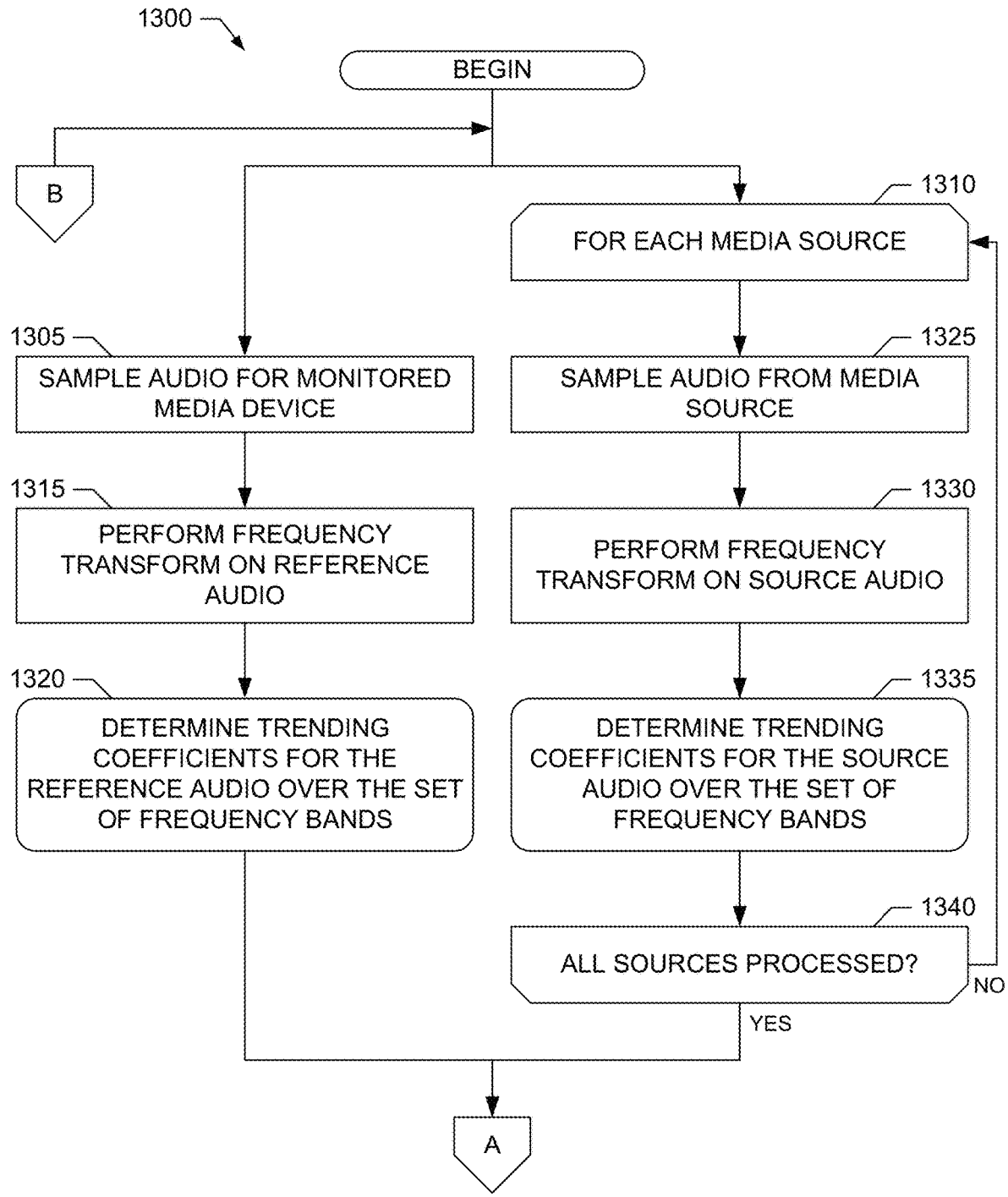
FIGS. 13A-B collectively form a flowchart representative of example machine readable instructions that may be executed to implement the example meters of FIGS. 1 and/or 2.
Figure 13B:
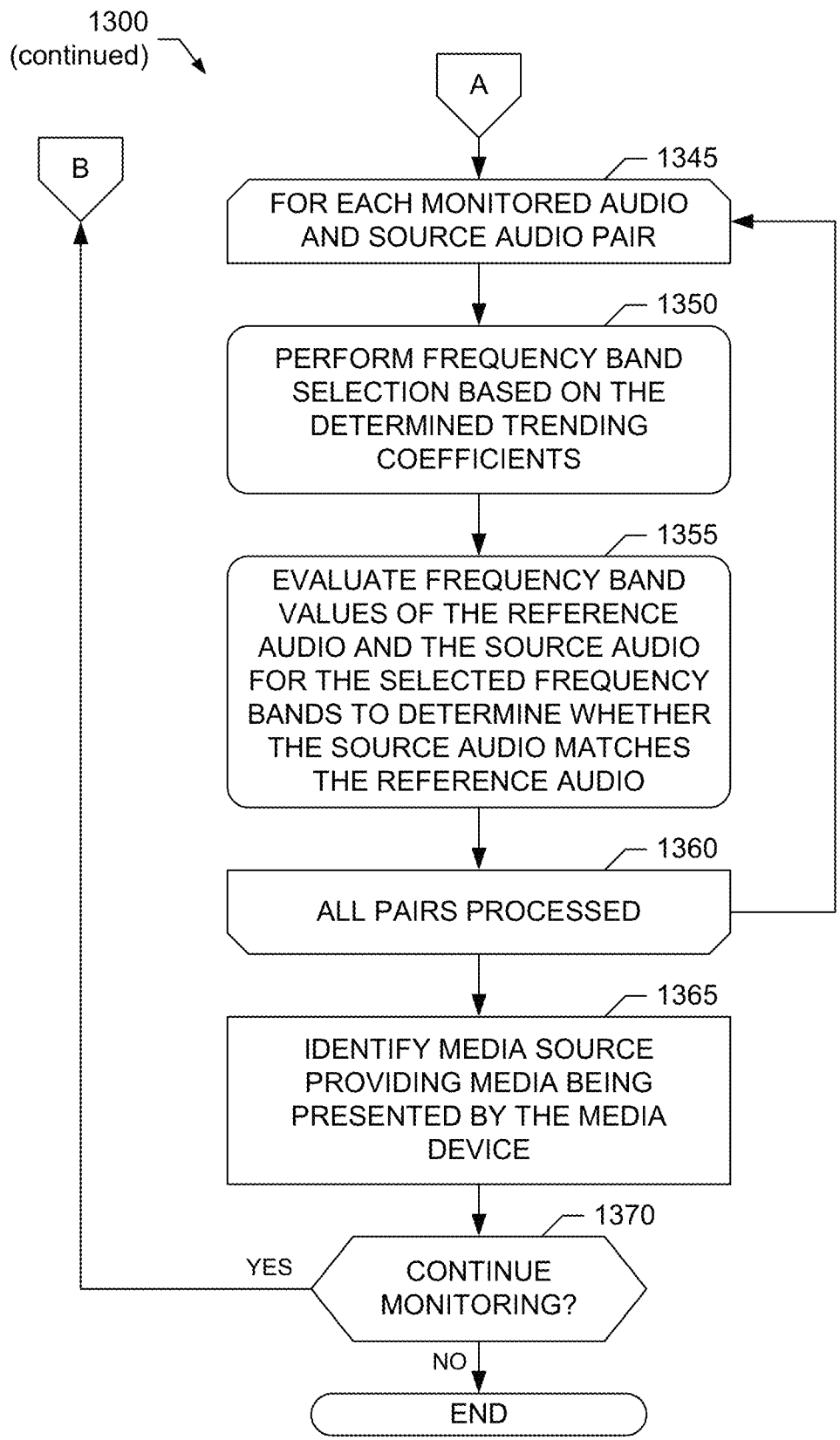
Figure 14:
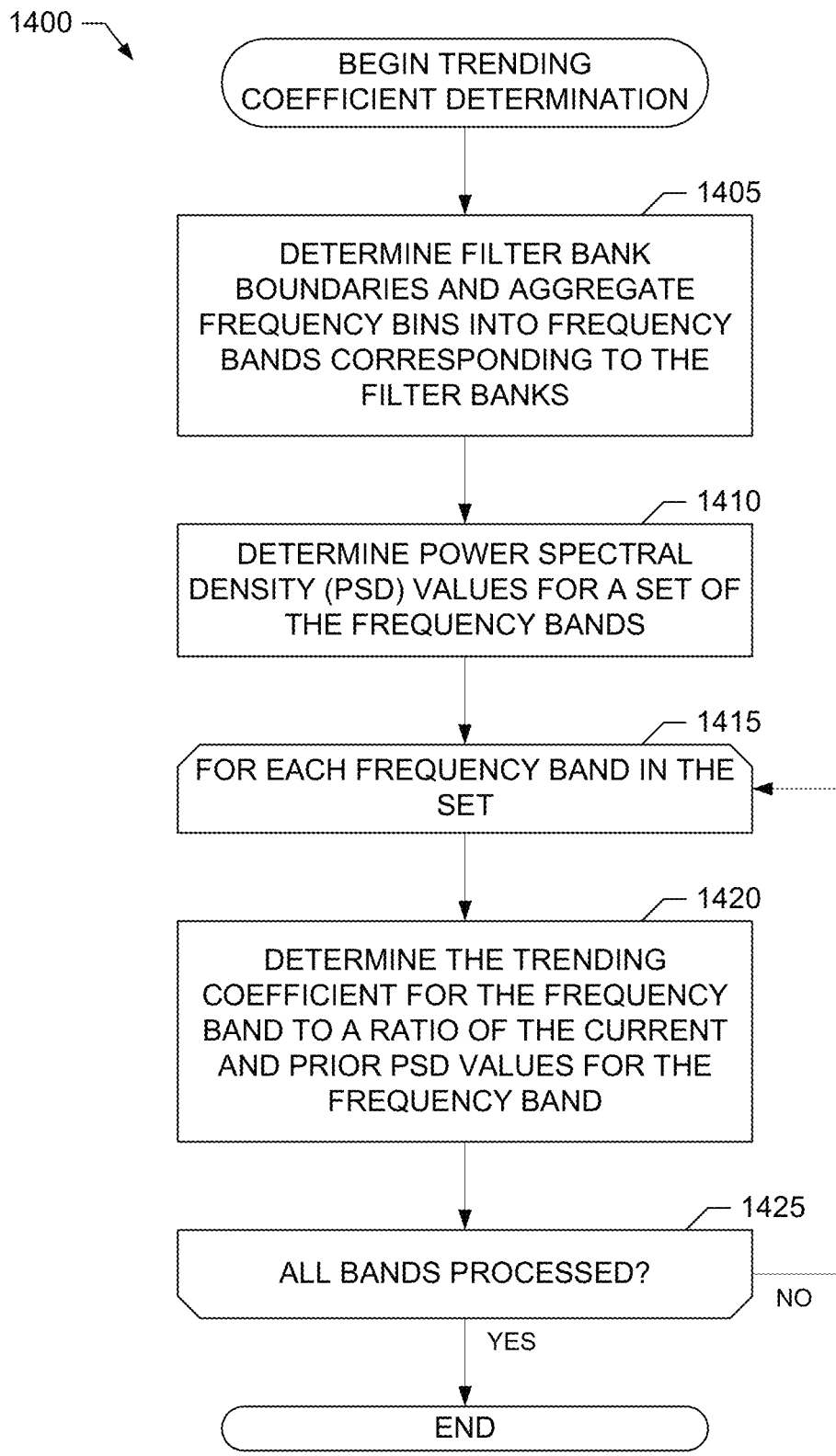
FIG. 14 is a flowchart representative of example machine readable instructions that may be executed to implement the example trending coefficient determiner of FIG. 3 and/or a portion of the example machine readable instructions of FIGS. 13A-B.

An example program 1300 that may be executed to implement the example meter 110 is represented by the flowchart shown in FIGS. 13A-B. The example program 1300 may be executed at predetermined intervals, based on an occurrence of a predetermined event, etc., or any combination thereof. With reference to the preceding figures and associated written descriptions, the example program 1300 of FIGS. 13A-B begins execution at blocks 1305 and 1310 of FIG. 13A at which the meter 110 executes parallel processing threads to process a reference (e.g., media device) audio signal obtained from the media device 115 at the reference input 125 of the meter 110, and to process source audio signals obtained from the media sources 120A-D at the source inputs 130A-D of the meter 110. For example, at block 1305, the audio sampler 210 of the meter 110 samples the reference (e.g., media device) audio signal obtained at the reference input 125 to obtain a reference audio block, as described above. At block 1315, the frequency transformer 220 of the meter 110 transforms the sampled reference (e.g., media device) audio block obtained at block 1305 into a frequency representation (or frequency transform) of the reference (e.g., media device) audio signal, as described above. At block 1320, the trending coefficient determiner 225 of the meter 110 processes the frequency representation (e.g., frequency transform) obtained at block 1315 to determine trending coefficients for the reference (e.g., media device) audio signal over a set of frequency bands (e.g., filter banks), as described above. Example machine readable instructions that may be used to perform the processing at block 1320 are illustrated in FIG. 14, which is described in further detail below.

At block 1310, the meter 110 begins processing source signals obtained from respective ones of the media sources 120A-D. For example, at block 1325, the audio samplers 205A-D of the meter 110 sample the source audio signal obtained at the source input 130A-D for the next media source 120A-D to be processed to obtain a source audio block for that media source 120A-D, as described above. At block 1330, the frequency transformers 215A-D of the meter 110 transform the sampled source audio block obtained at block 1330 into a frequency representation (or frequency transform) of the source audio signal, as described above. At block 1335, the trending coefficient determiner 225 of the meter 110 processes the frequency representation (e.g., frequency transform) obtained at block 1330 to determine trending coefficients for the given source audio signal over the set of frequency bands (e.g., filter banks), as described above. Example machine readable instructions that may be used to perform the processing at block 1335 are illustrated in FIG. 14, which is described in further detail below. At block 1340, the meter 110 causes the foregoing processing to repeat until trending coefficients are determined for all of the media sources 120A-D for the current detection time.

Figure 15:
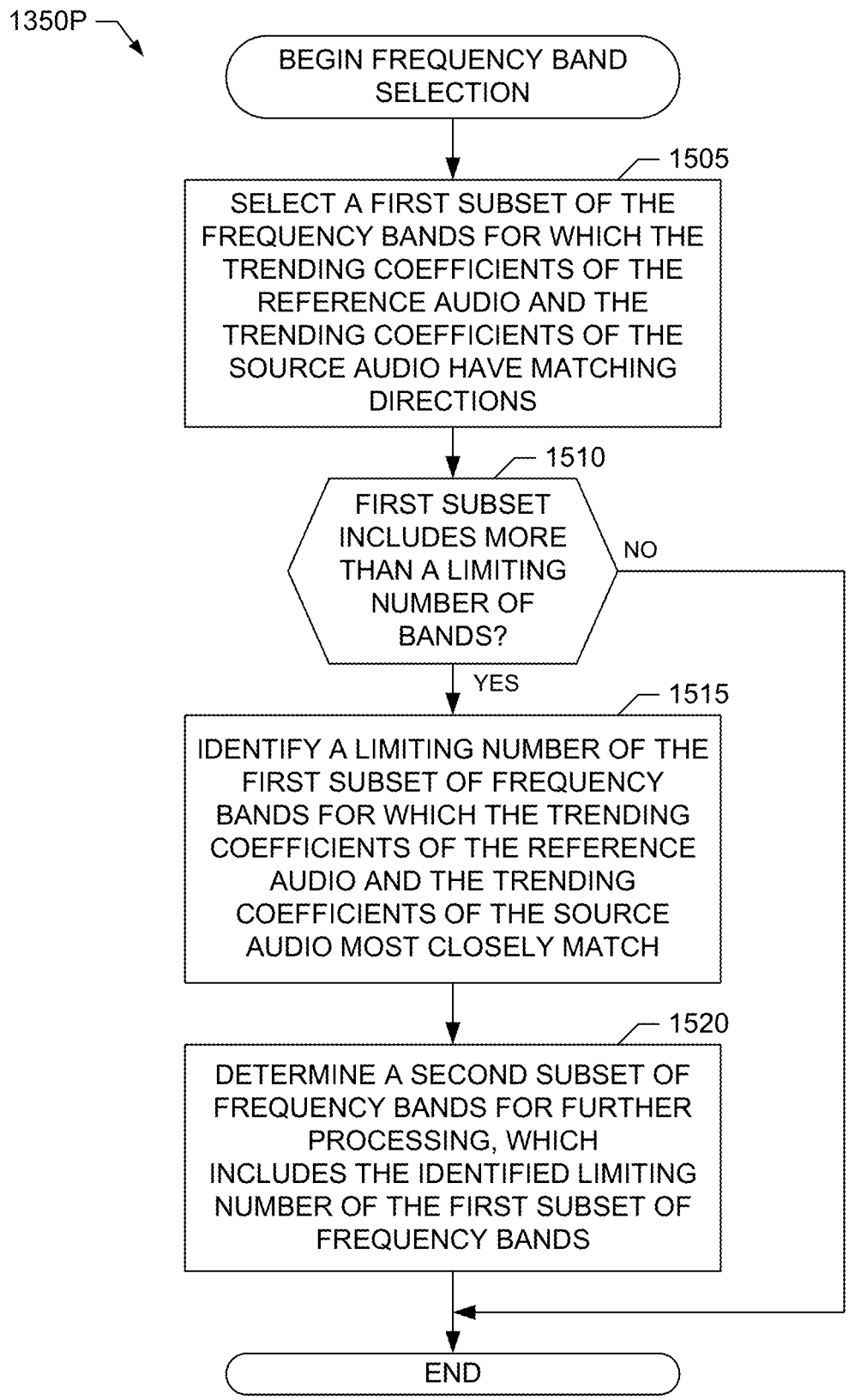
FIG. 15 is a flowchart representative of example machine readable instructions that may be executed to implement the example frequency band selector of FIG. 8 and/or a portion of the example machine readable instructions of FIGS. 13A-B.
Figure 16:
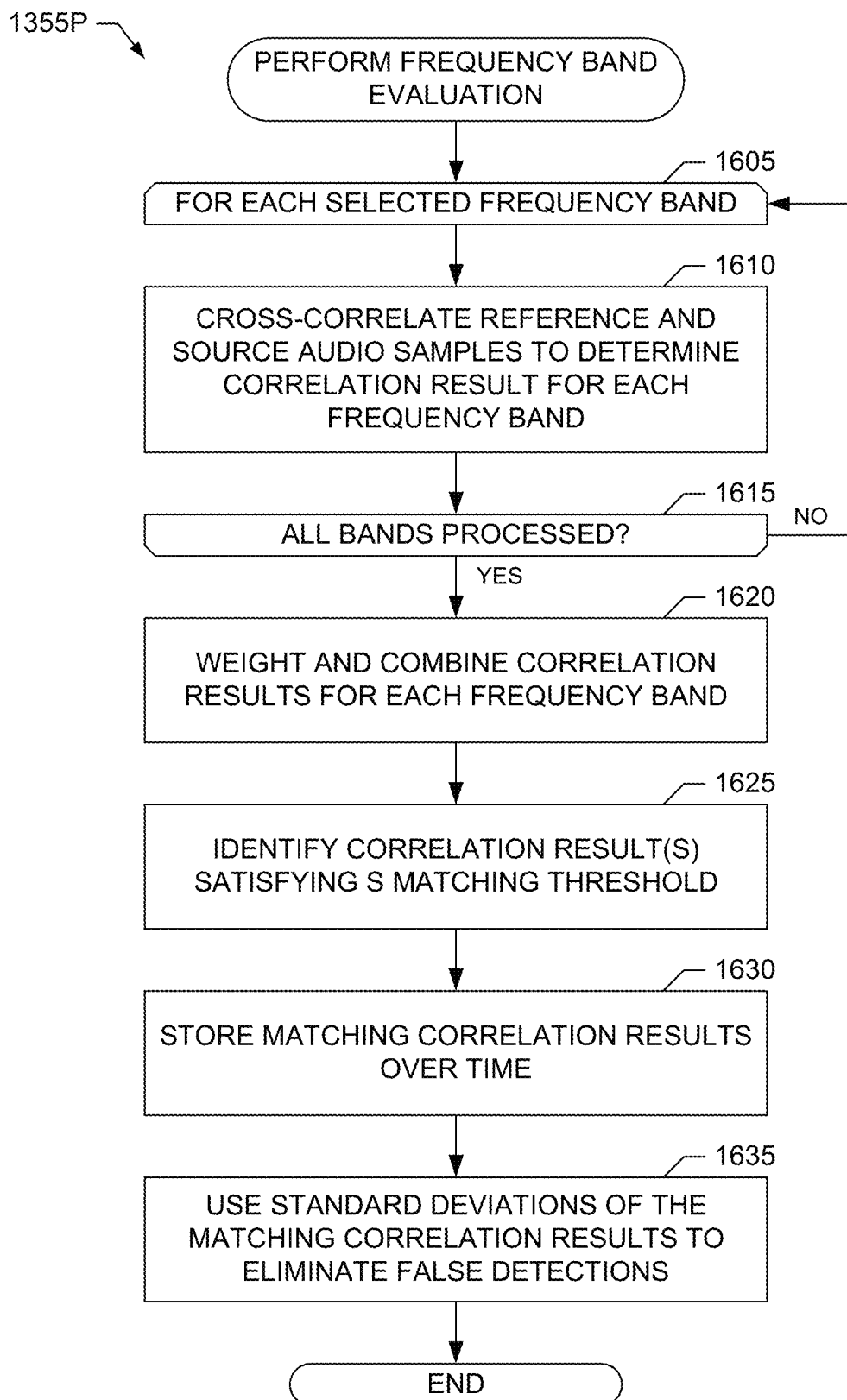
FIG. 16 is a flowchart representative of example machine readable instructions that may be executed to implement the example media source comparator of FIG. 9 and/or a portion of the example machine readable instructions of FIGS. 13A-B.

Processing continues at block 1345 of FIG. 13B, at which the meter 110 performs pairwise comparison between the reference audio signal obtained from the media device 115 and respective ones of the audio signals obtained from the media sources 120A-D. For example, at block 1350, the frequency band selector 230 updates the selected subset of frequency bands (filter banks) to be used to perform the pairwise comparison of a given reference (e.g., media device) audio signal and source audio signal pair, as described above. Example machine readable instructions that may be used to perform the processing at block 1350 are illustrated in FIG. 15, which is described in further detail below. At block 1355, the media source comparator 235 evaluates the frequency band values of the reference (e.g., media device) audio signal and source audio signal pair obtained at blocks 1315 and 1330 for the subset of frequency bands (filter banks) selected at block 1350 to determine an overall match result indicating whether the source audio from the given media source 120A-D matches the reference audio from the media device 115. Example machine readable instructions that may be used to perform the processing at block 1355 are illustrated in FIG. 16, which is described in further detail below. At block 1360, the meter 110 repeats the foregoing processing until overall match results are obtained for each possible reference (e.g., media device) audio signal and source audio signal pair.

At block 1365, the media source comparator 235 compares the overall match results for the different possible reference (e.g., media device) audio signal and source audio signal pairs (and performs validation, as described above) to identify the source audio signal that matches (or is the most likely match to) the reference (e.g., media device) audio signal. For example, if one valid overall match result corresponding to one possible reference (e.g., media device)

audio signal and source audio signal pair is determined by the media source comparator 235, then the source audio signal of that pair is determined to match the reference (e.g., media device) audio signal. However, if multiple valid overall match results corresponding to multiple possible reference (e.g., media device) audio signal and source audio signal pairs are determined by the media source comparator 235, then the media source comparator 235 may select the particular source audio signal pair corresponding to the largest overall match result to be the matching source signal for the current match detection time period. Next, at block 1370, the meter 1370 determines whether monitoring is to continue for a next match detection time. If monitoring is to continue (block 1370), then processing returns to block 1305 and 1310 at which the meter 110 obtains and processes the next reference (e.g., media device) and source audio blocks for the next match detection time period.

An example program 1400 that may be executed to implement the example trending coefficient determiner 225 of the example meter 110, and/or to perform the processing at blocks 1320 and/or 1335 of FIG. 13A, is represented by the flowchart shown in FIG. 14. With reference to the preceding figures and associated written descriptions, the example program 1400 of FIG. 14 begins execution at block 1405 at which the filter bank aggregator 305 of the trending coefficient determiner 225 determines the boundaries for the set of frequency bands (filter banks) to be examined, and aggregates the FFT bins of the frequency transform of the given audio signal (e.g., reference or source audio signal) being processed into the aggregated frequency bands (filter banks), as described above. At block 1410, the PSD determiner 310 of the trending coefficient determiner 225 determines, as described above, the frequency band values (e.g., PSD values) of the given audio signal for each band (bank) of the set of frequency bands (filter banks) obtained at block 1405.

At block 1415, the trending coefficient determiner 225 begins determining the trending coefficients for the given audio signal for the respective bands (banks) of the set of frequency bands (filter banks). For example, at block 1420, the PSD ratio evaluator 315 determines the trending coefficient for a given frequency band (filter bank) to be a ratio of the current and prior frequency band values (e.g., PSD values) for the given frequency band (filter bank), as described above. As also described above, the frequency band values (e.g., PSD values) processed at block 1420 can be running averages of the frequency band values (e.g., PSD values) for the given frequency band (filter bank). At block 1425, the trending coefficient determiner 225 causes the foregoing processing to repeat until a trending coefficient for the given audio signal has been determined for each one of the bands (banks) in the set of frequency bands (filter banks).

An example program 1350P that may be executed to implement the example frequency band selector 230 of the example meter 110, and/or to perform the processing at block 1350 of FIG. 13B, is represented by the flowchart shown in FIG. 15. With reference to the preceding figures and associated written descriptions, the example program 1350P of FIG. 15 begins execution at block 1505 at which the trending coefficient direction comparator 805 of the frequency band selector 230 identifies a first subset of frequency bands (filter banks) for which the reference (e.g., media device) audio signal and a given one of the source audio signals have trending coefficients with matching directions, as described above. At block 1510, the frequency band selector 230 determines whether the first subset of frequency bands (filter banks) identified at block 1510 includes more than a limiting number (e.g., 8 or some other number) of bands (banks), as described above. If the first subset of frequency bands (filter banks) does not include more than the limiting number of bands (banks), then match comparison will be performed based on the first subset of frequency bands (filter banks) selected at block 1510. However, if the first subset of frequency bands (filter banks) does include more than the limiting number of bands (banks), then at block 1515, the trending coefficient value comparator 810 of the frequency band selector 230 identifies a limiting number (e.g., 8 or some other number) of the first subset of frequency bands (filter banks), which have trending coefficients with matching directions for the reference (e.g., media device) audio signal and the given source audio signal, that also have the closest matching values of their respective trending coefficients. At block 1520, the trending coefficient value comparator 810 determines a second subset of frequency bands (filter banks), which includes the limiting number of bands (banks) identified at block 1515. This second subset of frequency bands (filter banks) is then used to perform match comparison.

An example program 1355P that may be executed to implement the example media source comparator 235 of the example meter 110, and/or to perform the processing at block 1355 of FIG. 13B, is represented by the flowchart shown in FIG. 16. With reference to the preceding figures and associated written descriptions, the example program 1355P of FIG. 16 begins execution at block 1605 at which the media source comparator 235 begins processing of the subset of frequency bands (filter banks) selected by the frequency band selector 230 for a given reference (e.g., media device) audio signal and source audio signal pair to perform a pairwise comparison of the reference and source signal to determine whether the source signal matches the reference (e.g., media device) signal, as described above. For example, at block 1610, the cross-correlator 905 cross-correlates the frequency band values of the reference (e.g., media device) audio signal and respective frequency band values of the given source audio signal for each one of the selected subset of frequency bands (filter banks) to determine correlation results for each one of the selected subset of the frequency bands (filter banks). At block 1615, the cross-correlator 905 continues processing until correlation results are determined for all of the selected subset of frequency bands (banks).

At block 1620, the weighter 915 of the media source comparator 235 weights the correlation results determined at block 1615, and the matcher 910 of the media source comparator 235 combines the weighted correlation results for the selected subset of frequency bands (banks), as described above. At block 1625, the matcher 910 identifies the correlation result(s) satisfying a matching threshold, as described above. At block 1630, the matcher 910 stores the matching correlation result, which satisfying the matching threshold, over time. At block 1635, the verifier 920 of the media source comparator 235 uses the standard deviations of time delays associated with the stored matching correlation results to eliminate false detections, as described above.

Figure 17:
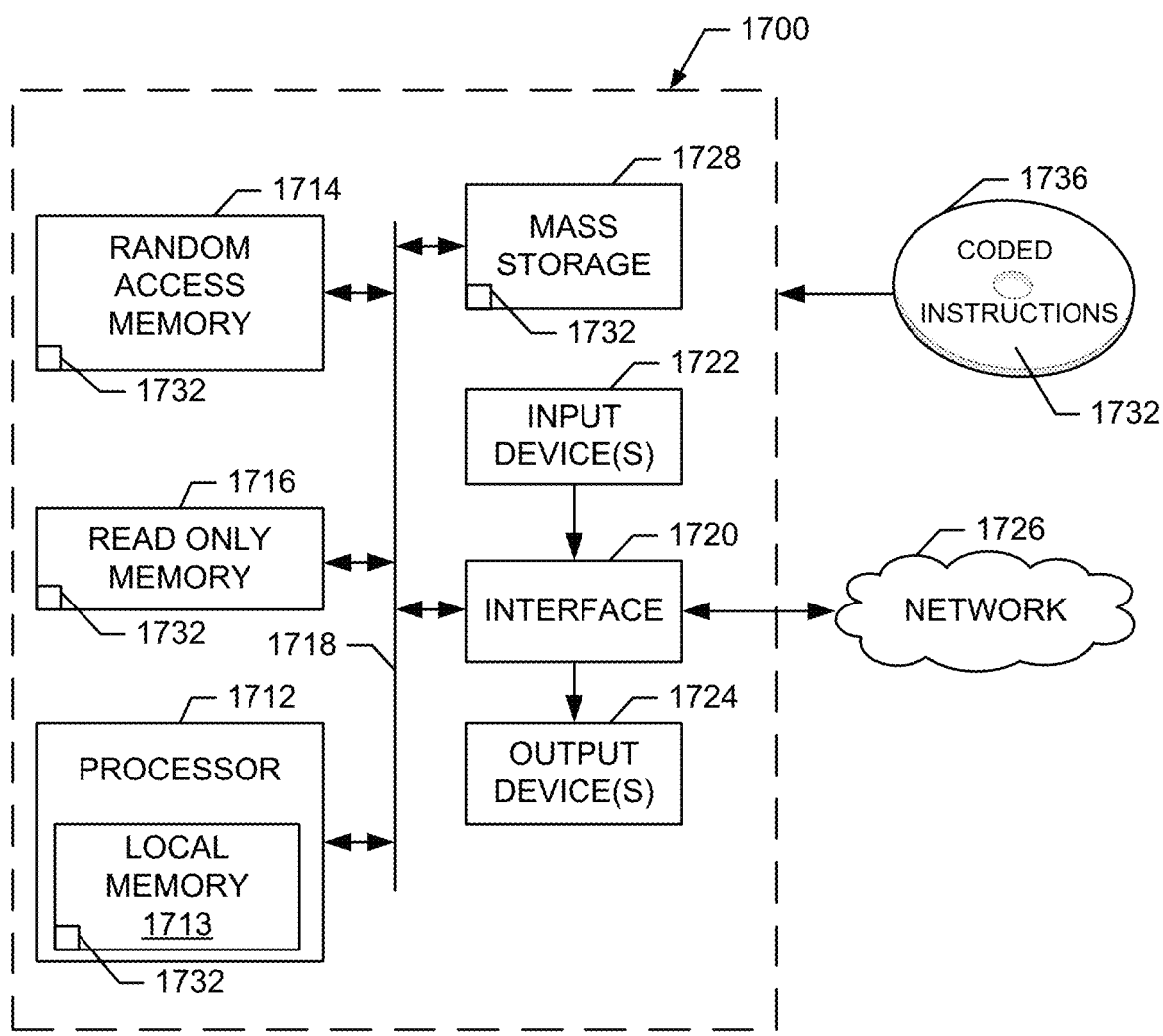
FIG. 17 is a block diagram of an example processor platform that may execute the example machine readable instructions of FIGS. 13A-B, 14, 15 and/or 16 to implement the example meters of FIGS. 1 and/or 2, the example trending coefficient determiner of FIG. 3, the example frequency band selector of FIG. 8 and/or the example media source comparator of FIG. 9.

FIG. 17 is a block diagram of an example processor platform 1700 capable of executing the instructions of FIGS. 13A-B and 14-16 to implement the example meter 110, the example audio samplers 205A-D, the example audio sampler 210, the example frequency transformers 215A-D, the example frequency transformer 220, the example trending coefficient determiner 225, the example frequency band selector 230, the example media source comparator 235, the example filter bank aggregator 305, the example PSD determiner 310, the example PSD ratio evaluator 315, the example trending coefficient direction comparator 805, the example trending coefficient value comparator 810, the example cross-correlator 905, the example matcher 910, the example weighter 915 and/or the example verifier 920 of FIGS. 1-12. The processor platform 1700 can be, for example, an embedded processor system, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer.

The processor 1712 of the illustrated example includes a local memory 1713 (e.g., a cache). The processor 1712 of the illustrated example is in communication with a main memory including a volatile memory 1714 and a non-volatile memory 1716 via a link 1718. The link 1718 may be implemented by a bus, one or more point-to-point connections, etc., or a combination thereof. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1700, can allow the user to control the computer system and provide data to the computer using physical gestures, such as, but not limited to, hand or body movements, facial expressions, and face recognition.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include floppy disk drives, hard drive disks, solid state drive (flash memory), compact disk drives, Blu-ray disk drives, RAID (redundant array of independent disks) systems, and digital versatile disk (DVD) drives.

Coded instructions 1732 corresponding to the instructions of FIGS. 13A-B and 14-16 may be stored in the mass storage device 1728, in the volatile memory 1714, in the non-volatile memory 1716, in the local memory 1713 and/or on a removable tangible computer readable storage medium, such as a CD or DVD 1736.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A meter comprising:
means for determining a source of a first audio signal, the means for determining to:
compare frequency band values of a first audio signal with corresponding frequency band values of a second audio signal for a first subset of a set of frequency bands to determine a first comparison result;
compare frequency band values of the first audio signal with corresponding frequency band values of a third audio signal for a second subset of the set of frequency bands different from the first subset of the set of frequency bands to determine a second comparison result; and
determine the source of the first audio signal based on the first comparison result and the second comparison result;
means for computing trending coefficients, the means for computing to determine a first set of trending coefficients for the first audio signal for the set of frequency bands, a second set of trending coefficients for the second audio signal for the set of frequency bands, and a third set of trending coefficients for the third audio signal for the set of frequency bands by:
accessing a first set of frequency band values determined for the set of frequency bands from a first block of audio samples of the first audio signal;
accessing a second set of frequency band values determined for the set of frequency bands from a subsequent second block of audio samples of the first audio signal; and
determining the first set of trending coefficients based on ratios of respective ones of the second set of frequency band values to respective ones of the first set of frequency band values; and
means for selecting subsets of frequency bands, the means for selecting to:
select the first subset of the set of frequency bands based on the first set of trending coefficients and the second set of trending coefficients; and
select the second subset of the set of frequency bands based on the first set of trending coefficients the third set of trending coefficients.

2. The meter of claim 1, wherein the means for selecting is to select the first subset of the set of frequency bands to correspond to ones of the set of frequency bands for which the first set of trending coefficients determined for the first audio signal and the second set of trending coefficients determined for the second audio signal have matching directions, and the means for selecting is to select the second subset of the set of frequency bands to correspond to ones of the set of frequency bands for which the first set of trending coefficients determined for the first audio signal and the third set of trending coefficients determined for the second audio signal have matching directions.

3. The meter of claim 2, wherein the means for selecting is to determine a first one of the first set of trending coefficients determined for the first audio signal and a corresponding first one of the second set of trending coefficients determined for the second audio signal have matching directions when either (1) both the first one of the first set of trending coefficients and the corresponding first one of the second set of trending coefficients exceed a threshold, or (2) both the first one of the first set of trending coefficients and the corresponding first one of the second set of trending coefficients do not exceed the threshold.

4. A meter comprising:
means for receiving a first audio signal from a monitored media device;
means for receiving a second audio signal from a first one of a plurality of media sources providing media to the media device;
means for receiving a third audio signal from a second one of the plurality of media sources;
means for determining a source of the audio signal, the means for determining to:
  compare frequency band values of the first audio signal with corresponding frequency band values of the second audio signal for a first subset of a set of frequency bands to determine a first comparison result;
  compare frequency band values of the first audio signal with corresponding frequency band values of the third audio signal for a second subset of the set of frequency bands different from the first subset of the set of frequency bands to determine a second comparison result; and
  determine the source of the first audio signal based on the first comparison result and the second comparison result; and
means for selecting the first and second subsets of the set of frequency bands.

5. The meter of claim 4, wherein the frequency band values of the first audio signal, the frequency band values of the second audio signal and the frequency band values of the third audio signal are respective power spectral density values, and further including means for computing power spectral densities, the means for computing power spectral densities to:
  process samples of the first audio signal to determine power spectral density values of the first audio signal for the set of frequency bands;
  process samples of the second audio signal to determine power spectral density values of the second audio signal for the set of frequency bands; and
  process samples of the third audio signal to determine power spectral density values of the third audio signal for the set of frequency bands.

6. The meter of claim 4, wherein the means for selecting is to select the first subset of the set of frequency bands based on a first set of trending coefficients determined for the first audio signal for the set of frequency bands and a second set of trending coefficients determined for the second audio signal for the set of frequency bands, and the means for selecting is to select the second subset of the set of frequency bands based on the first set of trending coefficients determined for the first audio signal for the set of frequency bands and a third set of trending coefficients determined for the third audio signal for the set of frequency bands.

7. A meter comprising:
means for comparing a first audio signal from a monitored media device with a second audio signal from a first one of a plurality of media sources in communication with the monitored media device to determine a sequence of match results, the first audio signal associated with media presented by the media device; and
means for determining whether the first one of the media sources is a source of the media presented by the monitored media device, the means for determining to:
  compute a standard deviation of time delays associated with respective ones of the match results, the time delays limited to an allowed range; and
  determine whether the first one of the media sources is the source of the media presented by the monitored media device based on the standard deviation.

8. The meter of claim 7, wherein the respective ones of the match results include respective ones of the time delays and respective correlation values for successive comparisons of the first audio signal and the second audio signal.

9. The meter of claim 7, wherein a lower limit of the allowed range is a negative value.

10. The meter of claim 7, wherein the means for determining is to determine the first one of the media sources is not the source of the media presented by the monitored media device when the standard deviation exceeds a threshold.

11. The meter of claim 7, wherein when the first one of the media sources has been determined initially to be the source of the media presented by the monitored media device, the means for determining is to retain the first one of the media sources as the source of the media presented by the monitored media device when the standard deviation satisfies a threshold.

12. The meter of claim 11, wherein the threshold is a first threshold, and the means for determining is to initially determine the first one of the media sources is the source of the media presented by the monitored media device when one or more correlation values included in the sequence of match results satisfies a second threshold.

* * * * *